(12) United States Patent
Kuba

(10) Patent No.: US 7,123,425 B2
(45) Date of Patent: Oct. 17, 2006

(54) LIGHT PATH REFLECTING OPTICAL SYSTEM AND APPARATUS PROVIDED WITH THE SAME

(75) Inventor: Keiichi Kuba, Koganei (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/007,256

(22) Filed: Dec. 9, 2004

(65) Prior Publication Data
US 2005/0128604 A1   Jun. 16, 2005

(30) Foreign Application Priority Data
Dec. 11, 2003   (JP)   ............................ 2003-412925

(51) Int. Cl.
*G02B 17/00*   (2006.01)
(52) U.S. Cl. ........................ 359/726; 359/779; 359/774
(58) Field of Classification Search ................ 359/726, 359/774, 727, 729, 730, 732, 676, 738, 739, 359/740
See application file for complete search history.

(56) References Cited

U.S. PATENT DOCUMENTS 6,956,612 B1 * 10/2005 Bean et al. ................. 348/345
2004/0051960 A1 * 3/2004 Mihara ........................ 359/686

FOREIGN PATENT DOCUMENTS

| JP | 09-211287 | 8/1997 |
| JP | 10-020191 | 1/1998 |

* cited by examiner

*Primary Examiner*—Timothy Thompson
(74) *Attorney, Agent, or Firm*—Kenyon & Kenyon LLP

(57) ABSTRACT

An optical system comprises, at least, in order from an object side, a first lens group having positive refracting power, a second lens group having negative refracting power, a third lens group having positive refracting power, and a fourth lens group having positive refracting power, wherein at least, the second lens group and the fourth lens group move along an optical axis when magnification is changed from a wide angle end to a telephoto end, and the first lens group contains a light path reflecting element having refracting power.

57 Claims, 12 Drawing Sheets

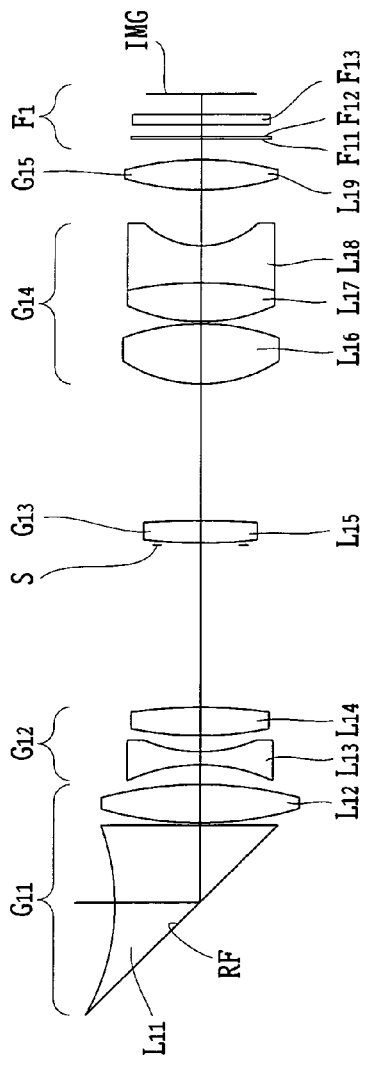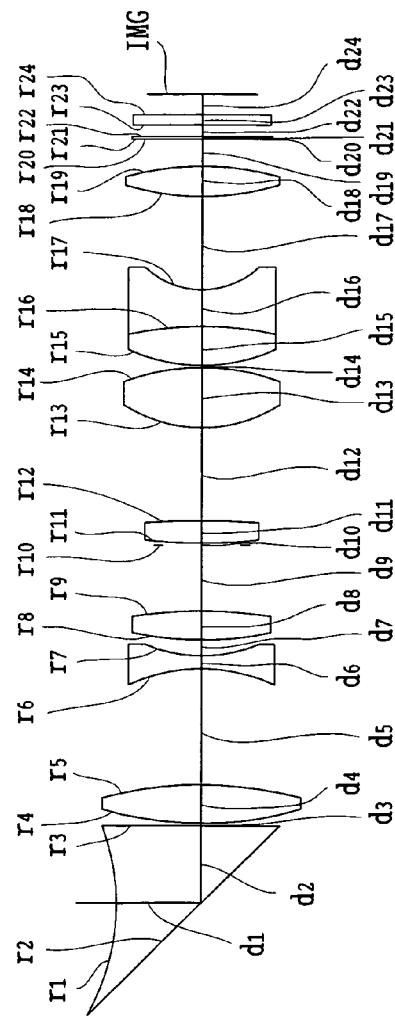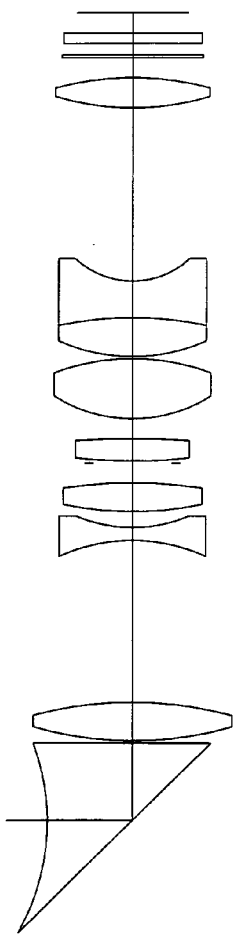
FIG. 1A
FIG. 1B
FIG. 1C

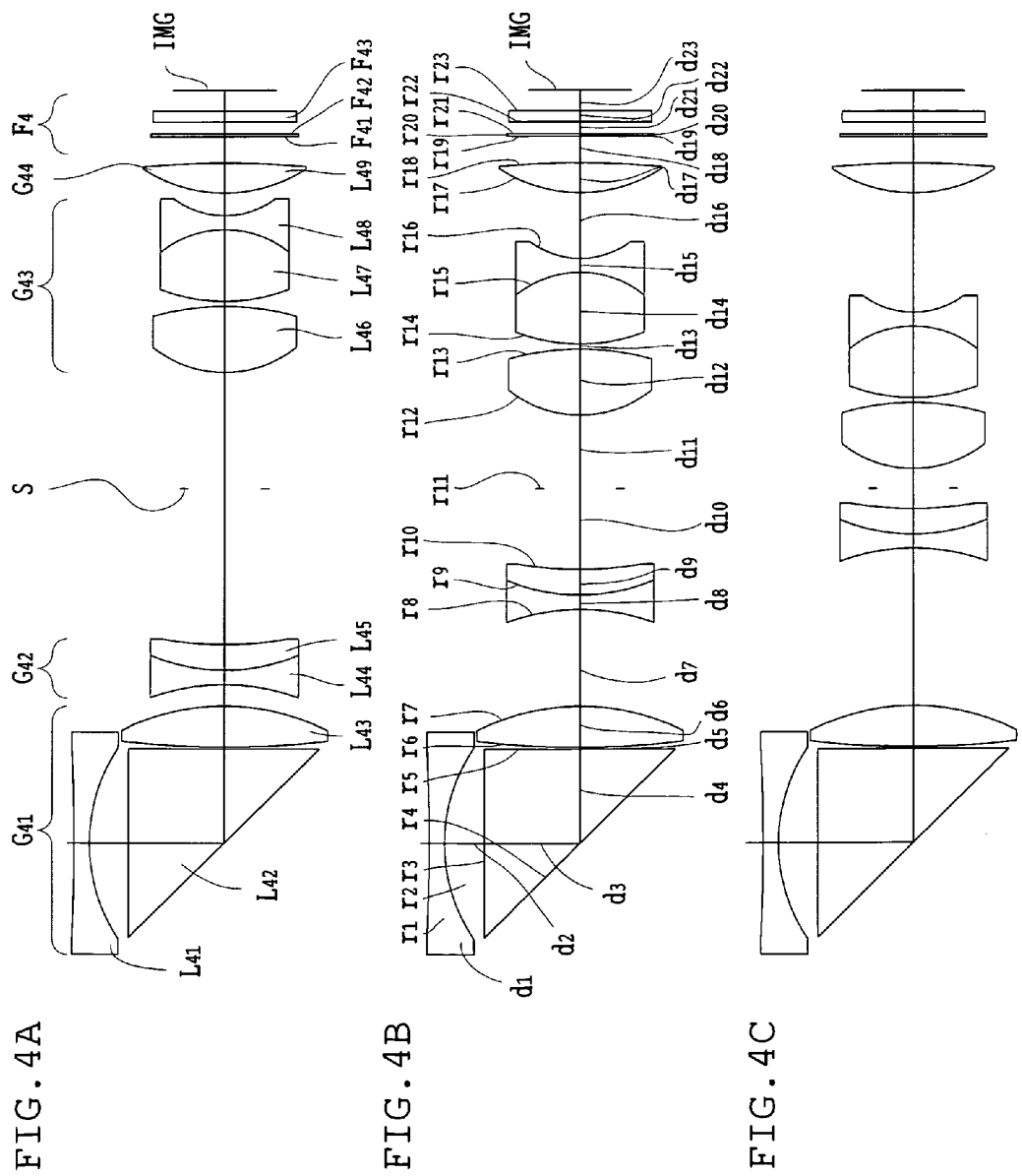

LIGHT PATH REFLECTING OPTICAL SYSTEM AND APPARATUS PROVIDED WITH THE SAME

The contents of application No. 2003-412925 filed on Dec. 11, 2003, in Japan, are hereby incorporated by reference.

BACKGROUND OF THE INVENTION

1. Field of the Invention

The present invention relates to a small sized variable magnification optical system, especially used for such as a digital camera, a personal digital assistant (PDA), a cellular phone and the like which carries a variable magnification optical system, and an apparatus provided with the same.

2. Description of the Related Art

To an image forming optical system which is built in and used for a miniature camera using an electronic imaging element, such as CCD, a personal digital assistant, a cellular phone, etc., a miniaturization, especially thinning of its shape has been strongly demanded. The following optical systems have been disclosed as conventional technology about these optical systems. For example, in No. Toku Kai Hei 10-20191 (Japanese Published Unexamined Patent Application), four groups zoom optical system in which a light reflecting path is arranged by using what cementing a plano-convex lens and a rectangular prism in a third lens group between the third lens group and a fourth lens group has been disclosed. In No. Toku Kai Hei 09-211287, what giving optical power to a prism for reflecting a light path has been disclosed.

SUMMARY OF THE INVENTION

The optical system having an element for reflecting a light path according to the present invention comprises, at least, in order from an object side, a first lens group having positive refracting power, a second lens group having negative refracting power, a third lens group having positive refracting power, and a fourth lens group having positive refracting power, wherein at least, the second lens group and the fourth lens group move along an optical axis when magnification changes from a wide angle end to a telephoto end, and the first lens group comprises the element which reflects a light path, and the element which reflects the light path has refracting power.

The optical system having an element for reflecting a light path according to the present invention comprises, at least, in order from an object side, a first lens group having positive refracting power, a second lens group having negative refracting power, a third lens group having positive refracting power, and a fourth lens group having positive refracting power, wherein at least, the second lens group and the fourth lens group move along an optical axis when magnification changes from a wide angle end to a telephoto end, and the first lens group comprises the element which reflects a light path, and the fourth lens group comprises two or more lens elements having positive refracting power.

The optical system having an element for reflecting a light path according to the present invention comprises, at least, in order from an object side, a first lens group having positive refracting power, a second lens group having negative refracting power, a third lens group having positive refracting power and a fourth lens group having positive refracting power, wherein at least, the second lens group and the fourth lens group move along an optical axis when magnification changes from a wide angle end to a telephoto end, and the first lens group comprises the element which reflects a light path, and the third lens group comprises three or more lens elements having positive refracting power.

The optical system having an element for reflecting a light path according to the present invention comprises, at least, in order from an object side, a first lens group having positive refracting power, a second lens group having negative refracting power, and a third lens group having positive refracting power, wherein at least, the second lens group and the third lens group move along an optical axis when magnification changes from a wide angle end to a telephoto end, and the first lens group comprises, in order from the object side a double concave lens element having negative refracting power, the element for reflecting a light path, and a covex lens element.

According to the present invention, the element for reflecting a light path which is a prism having a reflecting surface and refracting power.

According to the present invention, the first lens group comprises, in order from the object side, a negative lens or a negative lens surface, a portion for reflecting the light path of the element for reflecting the light path and a positive lens.

According to the present invention, the first lens group remains fixed when magnification changes from the wide angle end to the telephoto end.

According to the present invention, the first lens group comprises at least one aspherical surface.

According to the present invention, an entrance surface or an exit surface of the prism is aspherical.

According to the present invention, a surface at utmost object side of the first lens group is aspherical.

According to the present invention, at least one of lens groups having positive refracting power, arranged at an image side of the second lens group comprises an aspherical surface and two or more lens elements.

According to the present invention, a lens group arranged at utmost image side in the optical system is a lens group having positive refracting power, wherein focusing is performed.

The apparatus according to the present invention comprises the optical system and an electronic imaging element having an imaging surface, arranged at a position for receiving an object image formed by the optical system, wherein an incident optical axis of the optical system is arranged in parallel to a short lateral side of the imaging surface.

The apparatus according to the present invention comprises the optical system and an electronic imaging element having an imaging surface, arranged at a position for receiving an object image formed by the optical system, wherein distortion of an image is corrected on basis of an image on the imaging surface by electrical image processing.

According to the present invention, an absolute value of the maximum amount of distortion aberration of the optical system is less than 30%.

According to the present invention, the maximum corrected magnification when distortion aberration of the optical system is corrected is less than two times.

According to the present invention, a graph which shows a focal length of the optical system by a horizontal coordinate and the maximum distortion aberration of the optical system by a vertical coordinate does not have two or more peaks or bottoms.

The information processing apparatus according to the present invention comprises, an electronic image sensor arranged at the position which recieves an object image formed by the optical system, a processing means which processes an electronic signal in which photo electric conversion is performed by the electronic image sensor, an input section for inputting an information signal which an operator wants to input into the processing means, a display element which displays output from the processing means, and a recording medium which records output from the processing means, wherein the processing means is composed so that the object image recieved on the electronic image sensor may be displayed on the display element.

According to the present invention, a small-sized, variable magnification optical system which can be incorporated in a small digital still camera, a cellular phone, a personal digital assistant (PDA), and the like, and an apparatus having the same can be provided.

These features and advantages of the present invention will become apparent from the detailed description of the preferred embodiments when taken in conjunction with the accompanying drawings.

BRIEF DESCRIPTION OF THE DRAWINGS

FIGS. 1A, 1B and 1C are sectional views showing a light path reflecting optical system at a wide angle end, a middle position and a telephoto end respectively, in a first embodiment according to the present invention.

FIGS. 4A, 4B and 4C are sectional views showing a light path reflecting optical system at a wide angle end, a middle position and a telephoto end respectively, in a fourth embodiment according to the present invention.

DETAILED DESCRIPTION OF THE PREFERRED EMBODIMENTS

Figure 2A:
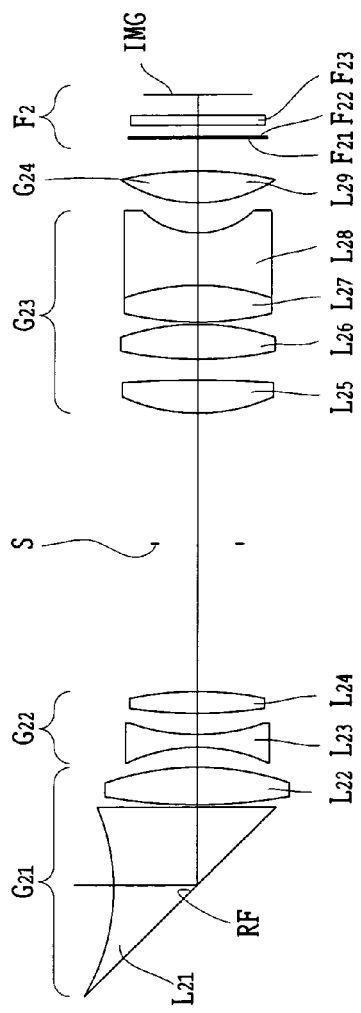
FIGS. 2A, 2B and 2C are sectional views showing a light path reflecting optical system at a wide angle end, a middle position and a telephoto end respectively, in a second embodiment according to the present invention.

Prior to explanation of embodiments, effects and functions according to the composition of the present invention will be explained.

The optical system of the present invention has at least, in order from an object side, a first lens group having positive refracting power, the second lens group having negative refracting power and the third lens group having positive refracting power. When a magnification is changed, two lens groups move along an optical axis from a wide angle end to a telephoto end.

Here, as conventionally, if the light path from the object side to an imaging surface in an imaging optical system is a straight line, the thickness of an imaging apparatus will become thicker than the overall length of an an imaging optical system. Therefore, a light path reflecting element is arranged in the present invention. In this way, a light path of an imaging optical system can be reflected by a reflecting surface for reflecting a light path. Consequently, thickness of the imaging apparatus can be made thin.

It is better to perform reflection of a light path at an object side as much as possible. That is because the depth dimension of the optical system and an effective diameter of the object side surface can be made smaller. Thus, effects of miniaturization of an optical system can be enlarged because the first lens group contains a light path reflecting element.

The optical system of the present invention is composed by basic constitution mentioned above and by having additional features further.

Here, one of the present inventions has the fourth lens group having positive refracting power, where a light path reflecting element has refracting power. By giving refracting power to the light path reflecting element, an effect of miniaturization of the size of the depth direction of the optical system and the effective diameter of the object side surface become large. Thus, improvement in performance of an optical system and reduction of the number of lens can be achieved.

As a light path reflecting element having refracting power, there are an internal reflection prism, a reflecting mirror having curvature, a reflection type variable shape mirror, etc. In case of the internal reflection prism, it is desirable that at least, either an entrance surface or an exit surface has curvature. Two lens groups which move are at least, the second lens group and the fourth lens group. That is, when magnification is changed from a wide angle end to a telephoto end, the second lens group and the fourth lens group are moved to a direction on an optical axis. At this time, it is desirable that the second lens group and the fourth lens group are moved so that a distance between the first lens group and the second lens group may be extended, a distance between the second lens group and the third lens group may be narrowed, and a distance between the third lens group and the fourth lens group may be narrowed. By this way, an optical system having long focal distance can be achieved.

An aperture stop is arranged before or back side of the third lens group having positive refracting power. And a when magnification is changed aperture stop and the third lens group are made fixed by such composition. It is more desirable to compose in such way, since a space for movement of the aperture stop or a shutter can be abolished and an optical system can be miniaturized more.

In another one of the present invention, in addition to basic composition, it has the fourth lens group of positive refracting power. Two lens groups which move are at least, the second lens group and the fourth lens group. That is, when magnification is changed from a wide angle end to a telephoto end, the second lens group and the fourth lens group are moved toward a direction of an optical axis.

At this time, it is desirable to move the second lens group and the fourth lens group so that a distance between the first lens group and the second lens group may be expanded, and a distance between the second lens group and the third lens group, and a distance between the third lens group and the fourth lens group may be narrowed. In this way, an optical system having a long focal length can be achieved.

And it is composed so that this fourth lens group contains two or more lens elements having positive refracting power. Thereby, light diverged by the second lens group can be well converged with the third lens group.

Here, it is necessary that the fourth lens group converges the light diverged by the second lens group having negative refracting power, with the third lens group. In this case, it is desirable that a lens element having positive refracting power is arranged at the object side of the fourth lens group.

Moreover, it is desirable that at least two lens elements having positive refracting power are included in order to converge fully a luminous flux and to achieve short focusing of the fourth lens group further, while keeping good performance. In this case, a lens element having positive refracting power of the fourth lens group arranged at utmost object side is composed to have the strongest positive refracting power in the fourth lens group. It is more desirable to compose in this way, since effects which converge a luminous flux fully and miniaturizes an optical system becomes large.

When magnification is changed from a wide angle end to a telephoto end, the fourth lens group moves along the optical axis. Then, it is desirable that at least one lens element having negative refracting power is included in the fourth lens group. By doing in this way, a fluctuation of various aberration including chromatic aberration accompanied by magnification change can be suppressed.

Moreover, it is desirable that the fourth lens group is composed to have an arrangement of positive-negative in order from an object side. By doing in this way, shortening of focal length of the fourth lens group can be achieved. Furthermore, by this composition, a principal point position moves toward the third lens group side, and a principal point distance between the third lens group and the fourth lens group can be shortened. Therefore, it leads to shortening of the total length of lens. This is desirable, since the magnification of the fourth lens group can be made high, and accordingly an amount of movement of the fourth lens group accompanied by magnification change can be made small.

In this case, effects mentioned above can be obtained by a small number of lenses if the fourth lens group comprises a lens element having positive refracting power, and a cemented lens consisting of a lens element having positive refracting power and a lens element having negative refracting power. Moreover, it is more desirable to use a cemented lens, since a decentering error, a space distance error, etc. are hardly influenced, and mechanism construction also becomes simple. Moreover, it is desirable that the cemented lens is made as meniscus shape, where a double convex lens and a double concave lens are cemented in order from the object side, and one of the concave surfaces is directed toward the image side. By such composition, a principal point position moves toward the third lens group side, and the principal point distance between the third lens group and the fourth lens group can be shortened. Therefore, it leads to shortening of a total length of lens.

Since the magnification of the fourth lens group can be high, an amount of movement of the fourth lens group accompanied by magnification change can be made small. Moreover, since negative refracting power is made strongly, chromatic aberration generated in the fourth lens group can be well corrected, and fluctuation of the chromatic aberration accompanied by magnification change can be suppressed.

Furthermore, in another present invention, the third lens group has two or more lens lens elements in basic composition. Two lens groups which move are at least, the second lens group and the third lens group. That is, when magnification is changed from a wide angle end to a telephoto end, the second lens group and the third lens group are moved toward a direction of the optical axis.

Here, it is necessary that the third lens group converges light diverged by the second lens group having negative refracting power. Then, it is desirable that at an object side of the third lens group, a lens a lens element having positive refracting power is arranged. At this time, it is desirable that the third lens group contains three or more lens a lens elements having positive refracting power. By this way, luminous flux can be fully converged, while securing good performance. This is desirable, since positive refracting power is shared by each of three lens elements having positive refracting power and sensitivity about manufacture error is reduced.

In this case, it is desirable that lenses having an arrangement of positive-negative in order of the object side in the third lens group. By doing in this way, shortening of focal length of the third lens group can be achieved. In this case, since the principal point shifts toward the second lens group side and a principal point distance between the second lens group and the third lens group can be shortened, shortening of a total length of lenses can be achieved. Moreover, this is more desirable, because an amount of movement of the third lens group can be made small as magnification of the third lens group can be made high.

It is desirable that the third lens group comprises in order from the object side, two lens a lens elements having positive refracting power, and a cemented lens consisting of a lens element having positive refracting power and a lens element having negative refracting power. By doing in this way, effects mentioned above can be obtained by a small number of lenses. It is more desirable, because, by using a cemented lens, an decentering error, a space distance error, etc. are hardly influenced, and mechanism construction also becomes simple.

In this case, it is better that a cemented lens is composed of a cemented lens consisting of a double convex lens and a double concave lensin order from the object side. Thus, a principal point position moves toward the second lens group side by forming a shape of the cemented lens as meniscus shape having a concave surface directed toward the image side. Consequently, since the principal point distance between the second lens group and the third lens group can be shortened, it leads to shortening of a total length of lens. Moreover, since the magnification of the third h lens group can be high, an amount of movement of the third lens group can be made small. Since negative refracting power can be made strong, the chromatic aberration generated in the third lens group can be well corrected. Moreover, a fluctuation of the chromatic aberration accompanied by magnification change can be suppressed.

In another one of the present invention, in the basic composition, the first lens group comprises in order from an object side, a double concave lens element having negative refracting power, a light path reflecting element and a convex lens. Two lens groups which move are at least, the second lens group and the third lens group. That is, when magnification is changed from a wide angle end to a telephoto end, the second lens group and the third lens group are made to move toward a direction in an optical axis.

In order to make a size at the image side of a light path reflecting portion small, it is more desirable that a lens or a lens surface before the light path reflecting portion has negative refracting power. On the other hand, for chromatic aberration correction, it is desirable that the first lens group has positive refracting power. Therefore, in order to make the light path reflecting element small and to secure good chromatic aberration by a small number of lenses, it is desirable to compose so that the first lens group comprises, in order from the object side, a lens or a lens surface having negative refracting power, the light path reflecting portion of a light path reflecting element and a lens having positive refracting power.

In this case, it is desirable that the lens having negative refracting power is composed of a double concave lens.

By composing in this way, function which makes a size after the light path reflecting portion small, becomes strong by strong negative refracting power. This negative lens is a lens arranged at object side of the light path reflecting portion of the light path reflecting element.

If distortion is well corrected by an optical system, the number of lenses increases and the optical system becomes large. Then, an optical system can be made into smaller size by correcting electrically the distortion which cannot be corrected by an optical system. In this case, a lens having strong negative refracting power is arranged at the object side departed from the first lens group. In this way, by generating a stronger negative distortion especially at the wide angle end, wider angle of view and higher magnification can be achieved. In this case, it is desirable that it has such power arrangement that a front side principal point of the first lens group projects to the object side of the first lens group, since effects such that an effective diameter of a lens and the total length of lenses are fully miniaturized becomes large.

Figure 5:
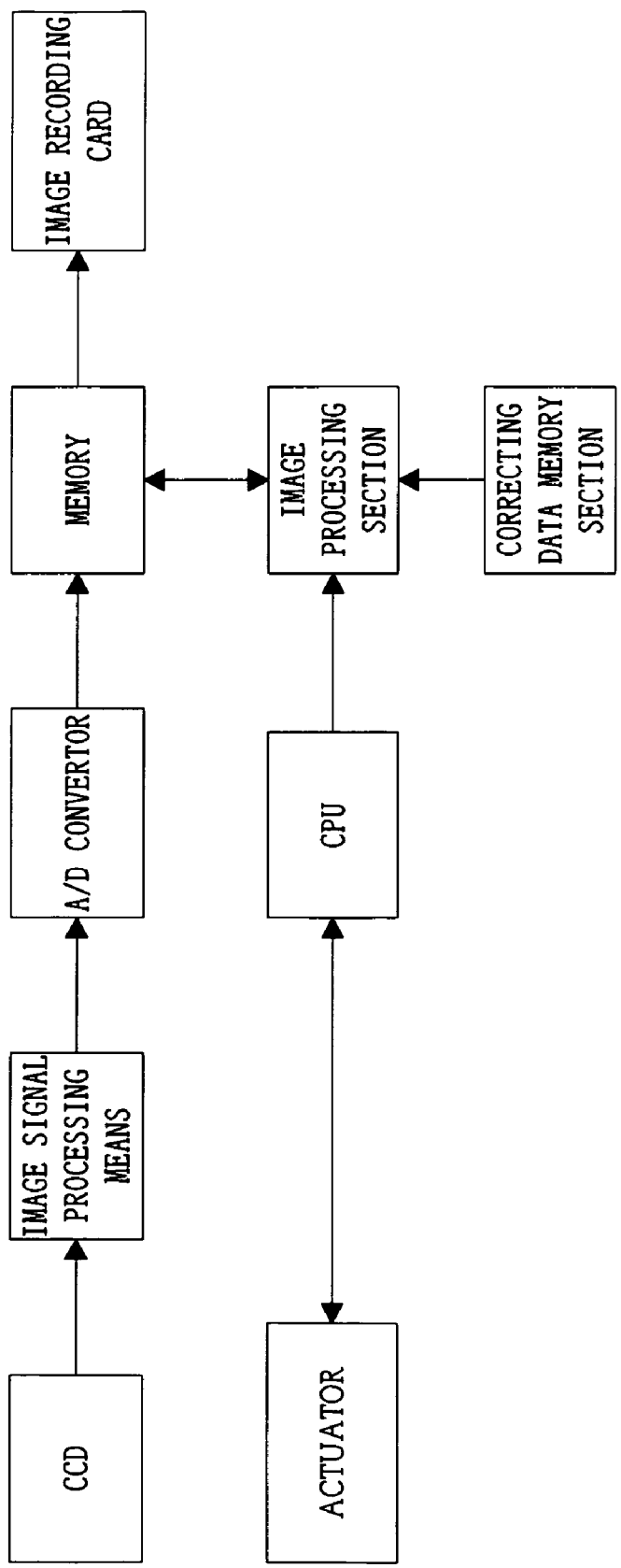
FIG. 5 is an explanatory drawing of electrical correction of distortion.

Here, an example of electrical correction of distortion is briefly explained using FIG. 5. The distortion of an image differs by distance of photographing object, focal length of an optical system, etc. By CPU, a picture signal acquired by an image sensor CCD through an image signal processing means and an A/D converter, is memorized in a memory. An image correction of this memorized image data is carried out in an image processing section using corrected data from a correcting data storage section. An actuator is operated so as to record the image data after correction in an image recording card.

When a lens element having strong negative refracting power is arranged at the object side of the first lens group, strong aberration is generated by the strong negative refracting power Then, it is desirable that this negative lens has an aspherical surface. It is desirable that this aspherical surface has an aspherical function which weakens a paraxial power as is departs from an optical axis, for aberration correction.

According to the present invention, the light path reflecting element is a light path reflecting prism having refracting power. According to this composition, the light path reflecting element shares a part of refracting power of the first lens group. In this way, the aberration correction capability of the first lens group increases and the number of lenses can be reduced. Therefore, an optical system can be made into smaller size.

Figure 6A:
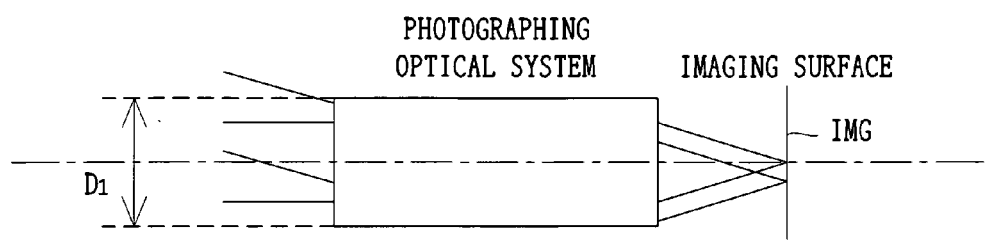
FIG. 6 is an explanatory drawing of reflecting a light path.
Figure 6B:
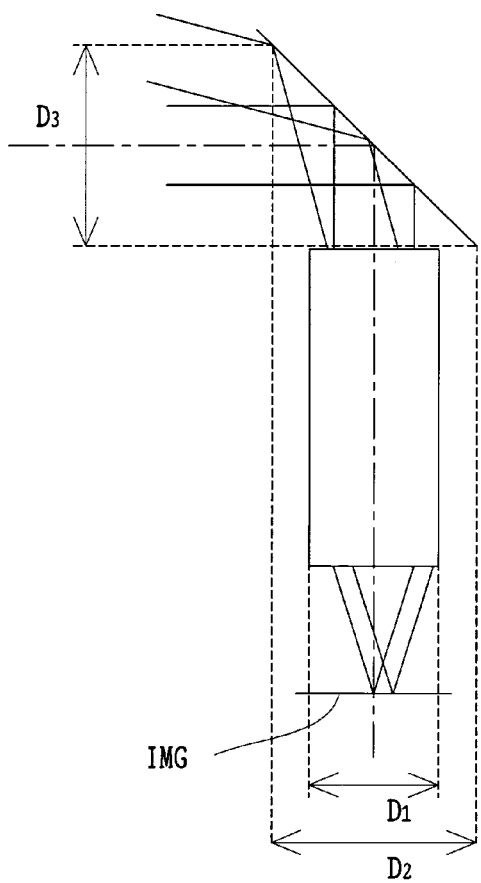
Figure 6C:
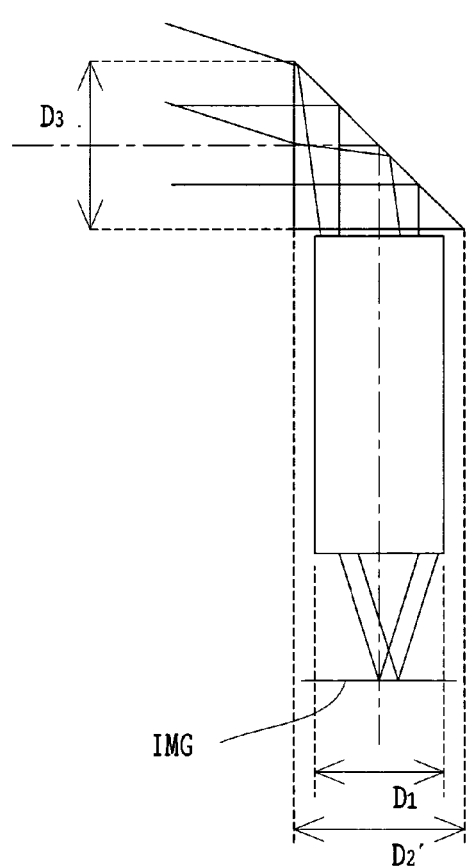

If a reflecting surface for reflecting a light path is a reflecting surface of a prism, light passes through a medium having refracting power bigger than 1. Therefore, the light path length converted by air becomes longer even if it is the same light path length. FIG. 6A shows a conventional optical system, FIG. 6B shows a light path reflecting optical system by a light path reflecting element, and FIG. 6C shows a relation between a size in depth direction and an effective diameter at the object side surface on a light path reflecting optical system using a light path reflecting prism. As shown in FIG. 6, according to the composition, size of the depth direction D2' of an optical system and the effective-diameter D3' of the object side surface can be made smaller. In this case, it is good enough if at least one of surfaces of the light path reflecting prism and an exit surface can have refracting power. If so, effects of miniaturization of the size of the depth D2' in the direction of the optical system and the effective diameter D3' of the object side surface becomes large, and accordingly improvement in performance of the optical system and reduction of the number of lenses can be achieved.

According to the present invention, a first lens group comprises, in order from an object side, a lens element or lens surface having negative refracting power, a light path reflecting portion of a light path reflecting element, and a lens having positive refracting power. In a lens group arranged at utmost an object side, and a lens group arranged at utmost an image side, a height of light off axis is high. In this way, by composing such that the first lens group arranged at utmost the object side contains both of a lens having negative refracting power and a lens having positive refracting power, an correction of magnification chromatic aberration and aberration off axis can be effectively performed. On the other hand, in order that a size after a light path reflecting portion is made small, it is desirable that a lens or a lens surface having negative refracting power is arranged at the object side of the light path reflecting portion. As mentioned above, in order to miniaturize an optical system, while securing good chromatic aberration with a small number of lenses, it is more desirable that the first lens group is composed, in order from an object side, of a lens having negative refracting power, a light path reflecting portion of a light path reflecting element, and a lens having positive refracting power. In this case, negative refracting power of the object side of the light path reflecting portion is made stronger to such extent that a principal point position at front side of the first lens group projects to the object side from the first lens group. In this way, a lens effective diameter and a total length of lens can be fully miniaturized.

According to the the present invention, it is composed that magnification change or focusing is performed by moving a lens group arranged at the image side of the light path reflecting element, or some of lenses in the lens group arranged at the image side of the light path reflecting element toward the direction on the optical axis.

For example, it is supposed that magnification change or focusing is performed by including a lens at an object side of the light path reflecting element. In this case, it is necessary to secure a range (space) in which a lens can be moved on the light path of the object side before the light path is reflected. Therefore, the thickness of an imaging apparatus increases. It is supposed that a magnification change or a focusing is performed by both of a lens group at the object side of the light path reflecting element and a lens group at the image side. In this case, a mechanical structure for moving of the lens groups becomes complicated, and the imaging apparatus becomes large-sized. Therefore, by moving some lenses in the lens group arranged at the image side of the light path reflecting element, or the lens group arranged at the image side of the light path reflecting element toward a direction on the optical axis as the composition mentioned above, and by perfomoing magnification change or a focusing, an optical system can be made simpler and smaller.

Moreover, according to the the present invention, it is composed such that the first lens group remains fixed when magnification is changed from a wide angle end to a telephoto end.

An effective diameter of the first lens group arranged at utmost the object side is large and its weight is also heavy. The first lens group comprises the light path reflecting element. Therefore, it becomes a burden of the mechanical structure to move the whole first lens group to direction toward the optical axis when magnification is changed. This becomes a problem especially when the light path reflecting element is a light path reflecting prism. According to the composition mentioned above, by composing that the first lens group is fixed, thinning of the imaging apparatus can be achieved without using a mechanical structure like a collapsible type structure. Moreover, the mechanical structure becomes simple and durability of the imaging apparatus increases. Furthermore, it becomes easy to process water proofing.

It is supposed that a lens other than a first lens group is moved to the direction of an optical axis, while a light path reflecting element remains fixed, when magnification is changed. In this case, if a lens group at an object side of a light path reflecting element is moved toward the direction on an optical axis, the thickness of an imaging apparatus becomes thick. Then, it is supposed that magnification change or focusing is performed by both of the lens group at the object side of the light path reflecting element and the lens group at the image side. In this case, the mechanical structure for a movement of the lens group becomes complicated, and the imaging apparatus becomes large. Then, if it is made to move only the first lens group at the image side of the light path reflecting prism toward the direction on an optical axis, there is no problem mentioned above. However, coexistence of miniaturization of an optical system and securing of a high zoom ratio is difficult by such system that only a part of the first lens group is used for magnification change. From reasons mentioned above, it is desirable that magnification change or focusing is performed while the first lens group which contains a light path reflecting element remains fixed.

According to the present invention, the first lens group comprises at least, one aspherical surface.

In the first lens group at the object side, the light height is high. Then, like this composition, if, at least, one aspherical surface is included in the first lens group, aberration off axis such as distortion, astigmatism and coma aberration can be corrected effectively. When correction of image distortion is performed electrically without correcting it in the optical system in order that the optical system has a wider angle of view, higher magnification and smaller size, the image distortion can be generated effectively if an aspherical surface is in the first lens group. In this case, if a surface at utmost object side of the first lens group is aspherical, the effect mentioned above is more effective.

According to the present invention, in case that a light path reflecting element is a light path reflecting prism, at least one of surfaces of the entrance surface or the exit surface of the light path reflecting prism is aspherical. In the light path reflecting prism contained in the first lens group, the light heght of light which passes through this is high. Then, if at least one surfaces of the entrance surface of the light path reflecting prism and the exit surface is aspherical, aberrations off axis, such as distortion, coma aberration and astigmatism can be corrected effectively.

In case that when a light path refrecting prism is manufactured by molding, there are few differences of the difficulty on manufacture between manufacture of the light path reflecting prism which has an spherical surface function and manufacture of the light path reflecting prism which has an aspherical function. Therefore, the light path reflecting prism having an aspherical function can be used. In this case, it is more desirable that an aspherical surface of a light path reflecting prism has the aspherical surface function which weakens power less than paraxial power as it departs from the optical axis for correction of aberration.

Furthermore, it is desirable that the aspherical surface configuration of the light path reflecting prism has an inflection point. In this case, for correction of aberrations, it is desirable that an optical function is reversed at the center of the effective diameter and at the peripheral portion of the effective diameter, wherein for example, a negative function is at a center of effective diameter and a positive function is at the center of the effective diameter. In this case, it is still more desirable that the entrance surface of the light path reflecting prism nearer an object is aspherical.

When the first lens group is composed of, in order from the object side, a lens element or a lens surface having negative refracting power, a light path reflecting element, and a lens having positive refracting power, it is effective if the lens having negative refracting power includes an aspherical surface. In this case, it is more desirable that this aspherical surface has an aspherical surface function which strengthens paraxial power as it departs from the optical axis. This is especially important when wider angle of view and higher magnification are made by generating a larger negative distortion at a wide angle end, and by correcting this distortion electrically, since effects in attaining wider angle and higher magnification becomes large.

According to the present invention, the lens group having positive refracting power which contains two or more lens elements at the image side of the second lens group includes at least one aspherical surface.

Since the second lens group has negative refracting power, a diameter of luminous flux which ejects from the second lens group is expanded. Therefore, as the diameter of luminous flux behind the third lens group is large, it is necessary to converge this luminous flux by the lens group having positive refracting power behind the third lens group. If a lens group having positive refracting power which has a main convergence function, and includes two or more lens elements at the image side of the second lens group includes at least one aspherical surface as the composition mentioned above, the aberration correction effect is large.

In this case, it is desirable that a surface at utmost object side of a lens group having positive refracting power which has two or more lens elements at the image side of the second lens group, or a surface directed toward an aperture stop is made aspherical since spherical aberration can be corrected effectively. It is desirable that this aspherical surface has an aspherical function which weakens paraxial power as it departs from an optical axis since positive spherical aberration can be suppressed.

According to the the present invention, it is at least, composed of, in order from the object side, a first lens group having positive refracting power, a second lens group having negative refracting power, a third lens group having positive refracting power, and a fourth lens group having positive refracting power, and focusing is performed by the last lens group having positive refracting power.

In case that an optical system uses an image sensors such as CCD, shortage of the quantity of light is caused when off axial light enters into CCD aslantly. Therefore, it is necessary to separate an exit pupil of an optical system from an image surface (ideally, CCD side is made telecentric). According to the composition mentioned above, securing of telecentric nature at the image side becomes easier by including the last lens group having positive refracting power. Moreover, correction of focusing and variation of an image surface position accompanied by magnification change can be effectively performed by moving the last lens group having positive refracting power toward the direction on an optical axis. In this case, it is desirable that the last lens group having positive refracting power is a lens group having positive refracting power which consists of one lens element having positive refracting power.

In order to shorten a total length of lens, it is good enough that the last lens group having positive refracting power is composed so as to perform mainly control of a pupil position. Therefore, it is not necessary to compose the last lens group having positive refracting power by using so many lenses. Then, if the the last lens group having positive refracting power is composed of one lens element having positive refracting power, the effect which controls a pupil position by a small number of lenses can be acquired. It is desirable to compose in this way, since the burden of a lens drive mechanism decreases, and a high-speed focusing can be performed. In this case, it is desirable that the lens element having positive refracting power is a double convex lens for aberration correction. When an object point position approaches a near point from infinite distance point, it is necessary to move the last lens group having positive refracting power toward an object side in line with an optical axis. When magnification is changed, the fourth lens group having positive refracting power moves toward a direction which narrows a distance to the third lens group having positive refracting power. Then, it is desirable that focusing is performed by the the last lens group having positive refracting power, since securing the distance between the fourth lens group having positive refracting power and the last lens group having positive refracting power at the telephoto end where amount of focusing is large, becomes no longer a restrictive condition.

Moreover, according to the present invention, the optical axis is reflected so that it may be parallel to the short side of the imaging surface of an imaging element.

When the imaging surface is a rectangle, by reflecting an optical axis so that it may become parallel to the short side of the imaging surface, thickness of the imaging apparatus can be made thin. D1 and D2' can be made small if the direction of short side of the imaging surface is the same to the direction on the plane of the paper on which FIG. 6 is shown, and the direction of long side of the imaging surface is the direction perpendicular to the paper plane. In this case, especially an effective diameter of the surface near the imaging surface becomes similar to the form of the imaging surface. Then, an an imaging optical system can be miniaturized by composing such that a form of the outer diameter of a lens is made so as to be a rectangle or an oval-shape, which is not a circular shape which has a center of circle on the optical axis.

According to the present invention, an image distortion can be electronically corrected by image processing.

If distortion is well corrected by an optical system, the number of lens increasse and the optical system becomes large. Then, an optical system can be made into smaller size by correcting electrically the distortion which cannot be corrected by an optical system. In this case, it is desirable that the absolute value of the distortion is 30% or less, because the quality of the picture after correcting the distortion electronically can be kept good.

According to the present invention, it is composed so that an absolute value of the maximum distortion may be 30% or less.

When the distortion is corrected and made a wide angle of view by image processing electrically, it is better to generate a distortion of minus in the wide angle end. In this case, if the amount of the maximum distortion becomes larger than −30%, the picture having electrically corrected distortion becomes coarse, since a corrected magnification of the utmost peripheral portion of the picture becomes large. Therefore, it is desirable that the absolute value of the maximum distortion is 30% or less. Furthermore, it is more desirable that the absolute value of the maximum distortion is 20% or less.

According to the present invention, it is composed such that the maximum of corrected magnification when a distortion is electrically corrected, is two times or less.

Figure 7:
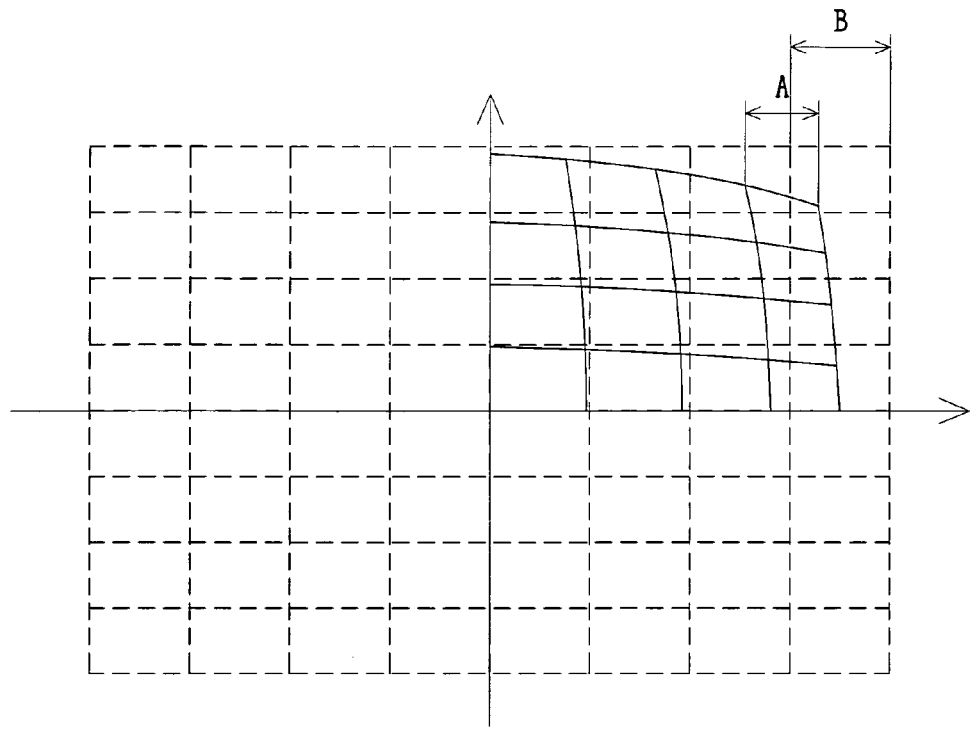
FIG. 7 is an explanatory drawing about enlarged magnification.

In FIG. 7, an enlarged magnification will be explained. For example, when distortion shown as a solid line in FIG. 7 has occurred, it is necessary to correct it as a dotted line shown in FIG. 7, by correcting distortion electrically. since a distortion differs by each image height, corrected magnification (B/A) differs by each picture element. In a portion where a corrected magnification is large (in many cases, utmost peripheral portion of the picture image), an image quality deteriorates. When a corrected magnification is large, a resolution of a portion of the center of the picture image and a resolution of a portion in which the corrected magnification of the picture image are large become to differ, and dispersion of the resolutions in the picture image poses a problem since there is no distortion on an axis in design. It is desirable that corrected magnification is made two times or less, since it will be hard to generate such problem, According to the present invention, in a figure where a horizontal axis represents the focal length of an optical system and vertical axis represents the maximum distortion, it is composed so that it may not have two or more peaks or bottoms.

Figure 8:
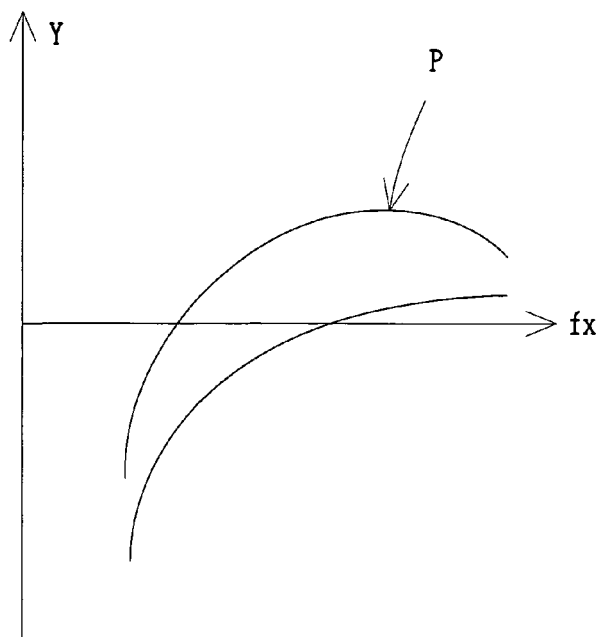
FIG. 8 is an explanatory drawing showing a relation between variable magnification and a maximum distortion.

FIG. 8 is an explanatory drawing when a relation between the magnification change and the maximum distortion is monotonous. For example, as the magnification changes, an amount of the maximum distortion changes as shown in FIG. 8. When variation of an amount of the maximum distortion Y accompanied with an amount of magnification fx is large, an amount of data for image correction increases, and accordingly the algorithm of the image correction becomes unstable. Consequently, the picture image after image correction tends to become unnatural. Then, it is desirable that FIG. 8 is a monotonous graph. In the graph of FIG. 8, it is desirable that a curve showing an amount of the maximum distortion Y which is accompanied by an amount of change of magnification fx does not have two or more maximal value P or minimum value. That is, it is desirable not to have two or more peaks or bottoms. Furthermore, as for the distortion at a specific focal length, it is desirable that it is not so-called a military hat type (cone shape) but a barrel type or a spool type.

Moreover, according to the present invention, it comprises, an electronic image sensor arranged in the position which recieves an object image formed by a variable magnification optical system, a processing means which processes an electronic signal in which photo electric conversion is performed by the electronic image sensor, an input portion for inputting an information signal which an operator wants to input into the processing means, a display element which displays output from the processing means, and a recording medium which records output from the processing means, wherein the processing means is composed so that the object image recieved on the electronic image sensor, may be displayed on the display element.

[The First Embodiment]

Hereafter, embodiments of the present invention will be explained using drawings. FIG. 1 shows a sectional view showing a light path reflecting optical system of the present invention.

FIG. 1A is a sectional view showing the optical system at a wide angle end telephoto end at the time of focusing at the infinite object point. FIG. 1B is a sectional view showing the optical system at a middle position at the time of focusing at the infinite object point. FIG. 1C is a sectional view showing the optical system at a telephoto end at the time of focusing at the infinite object point.

As shown in FIG. 1, the imaging optical system of the first embodiment has, in order from an object side, a first lens group G11 which has positive refracting power, the second lens group G12 which has negative refracting power, the third lens group G13 which has positive refracting power, the fourth lens group G14 which has positive refracting power, and the fifth lens group G15. F1 is a parallel plane board group, and is arranged between the last lens group and an imaging surface IMG. This parallel plane board group F1 is composed of a near-infrared cut filter F11, an optical low pass filter F12, and a cover glass F13 of a CCD, which is a an electronic image sensor. The combination of the parallel plane board mentioned above, its arrangement, etc. can be changed properly if needed.

The first lens group G11 comprises an optical element L11 having negative refracting power, and a lens L12 having double convex surfaces. The optical element L11 is a light path reflecting element, and has a lens surface having negative refracting power, the concave surface of which is directed toward the object side. Moreover, the optical element L11 has a reflecting optical surface RF for reflecting a light path, and also has a function as a reflecting prism for reflecting the light path by 90 degrees. The second lens group G12 is composed of, in order from the object side, a double concave lens L13 and a double convex lens L14. The third lens group G13 consists of a lens L15 having double convex surfaces. The fourth lens group G14 consists of a double convex lens L16 and a double convex lens L17 and a double convex lens L18. The above-mentioned lens L17 and the lens L18 are cemented. The fifth lens group G15 consists of a double convex lens L19.

Moreover, an aperture stop S is arranged between the second lens group G12 and the third lens group G13. In more detail, the aperture stop S is arranged near the object side surface of a lens L15.

When magnification is changed from a wide angle end to a telephoto end, each lens group is performed as follows. The second lens group G12 moves toward the image side so that a distance to the third lens group G13 may be narrowed. The fourth lens group G14 moves along the optical axis toward the object side so that a distance to the third lens group G13 may be narrowed. The fifth lens group G15 moves to the object side when magnification changes from the wide angle end to the middle positon and it moves to the image side when magnification changes from the middle positon to the telephoto end.

The positions of the first lens group G11, the aperture stop S and the third lens group G13 remain fixed to an imaging surface IMG. A focusing is performed by the fifth lens group G15. It is desirable to have such composition according to the first embodiment, since the positions of the third lens group G13 and the aperture stop S remain fixed when magnification is changed, and accordingly, a mechanical device becomes easy. Moreover, securing of telecentric function at the image side becomes easier by making refracting power of the last lens group G15 into positive refracting power.

An image point of the second lens group G12 is formed considerably near the object side position from the second lens group. In order to shorten a total length of lenses, it is necessary to make a principal point distance between the second lens group and lens groups having positive refracting power, arranged after the second lens group.

Then, if the fourth lens group G14 is composed of a positive lens and a negative lens in order from the object side, a principal point position move to the second lens group side. In this case, since the principal point distance between the second lens group and the lens group having positive refracting power, arranged after the second lens group G12 can be shortened, it brings shortening of the total length of leness. Since the magnification of the fourth lens group G14 can be high, an amount of movement of the fourth lens group G14 accompanied by a magnification change can be made small. In this case, an effect becomes greater if the last surface of the fourth lens group G14 is formed a concave surface directed toward the image side.

Moreover, the fourth lens group G14 is a lens group having positive refracting power with the function which converges the luminous flux diverged by the lens group having negative refracting power. Therefore, it is desirable that the fourth lens-group G14 contains at least two lenses having positive refracting power and one lens having negative refracting power.

It is desirable that a lens group which moves along the optical axis when magnification is changed, comprises a lens having positive refracting power and a lens having negative refracting power. If it is composed in this way, a fluctuation of chromatic aberration accompanied by the magnification change of the whole optical system can be suppressed by suppressing the fluctuation of the chromatic aberration accompanied by the magnification change.

It is desirable that the optical element L11 satisfies vd≦35. It is desirable that the second lens group G12 contains a lens having positive refracting power that the difference Δvd of an Abbe's number is set to Δvd≧12, and a lens having negative refracting power. It is desirable that the fourth lens group G14 contains a lens having positive refracting power that the difference Δvd of an Abbe's number is set to Δvd≧20, and a lens having negative refracting power.

As to an aspherical surface, an incidence plane of the optical element L11, an object side surface of the lens L12, an object side surface and an image side surface of the lens L13, an image side face and an object side surface of the lens L16, and an object side surface of the cemented lens L17 are aspherical. It is desirable that these aspherical surfaces have an aspherical surface function which weakens paraxial power as they depart from the optical axis for correcting of aberration.

Since a heght of light is the highest in the lens group at utmost image side, aberrations off axis such as distortion, astigmatism, coma aberration, etc, and pupil aberration can be corrected effectively. Then, the lens group at utmost image side can be composed to contain at least, one aspherical surface. In this case, it is more desirable that it has an aspherical surface function which weakens power more than paraxial power, as they depart from the optical axis.

The first lens group G11 and the fourth lens group G14 are arranged at a position distant from the aperture stop S. It is desirable that in such lens groups, major diameter is that of a rectangular rather than that of a circle. Thus, it is desirable if weight saving of a lens group is achieved since burden of an actuator decreases.

If an optical axis is reflected so that it may become parallel to the short side of an imaging surface in case that the imaging surface is a rectangle like CCD, thickness of the imaging apparatus can be made thin.

FIG. 6 is an explanatory drawing of a light path reflecting. FIG. 6A shows a short side of an imaging surface in a conventional optical system. FIG. 6B is a schematic diagram of a reflecting optical system of a light path by a reflecting element of the light path. FIG. 6C is a schematic diagram of a reflecting optical system of a light path by a light path reflecting prism.

When a direction on the plane of this paper of this figure is a direction of short side of an imaging surface, and a perpendicular direction to the plane is a direction of long side of the imaging surface, D1 and D2' can be made small. In this case, an effective diameter of the lens group at utmost the object side and the lens at utmost the image side becomes close to a form of the imaging surface. Then, if a shape of major diameter of a lens is formed rectangle rather than circular shape having a center on the optical axis, an an imaging optical system can be miniaturized.

In this embodiment, although the value of telephoto focal length/wide angle focal length is 2.86 times, wider angle of view, and higher magnification such that the value of wide angle of view/telephoto angle of view is three times, have been achieved, by generating negative image distortion at the wide angle end. And the image distortion generated accompanied with increasing of angle of view and magnification is corrected electrically.

In the above-mentioned optical system, when a lens surface is formed aspherical, it is desirable that the lens having an aspherical surface is composed of glass, and transition point Tg satisfies the following condition.

60° C.<Tg<620° C.

It is difficult to form an aspherical surface by polishing precisely, and also it is difficult to process it in large quantities by grinding. When a lens having an aspherical surface satisfies the above-mentioned condition, it is possible to process it by glass molding method. As a result, an aspherical lens is easily producible in large quantities.

Therefore, an optical system becomes cheap. Accordingly, when an aspherical surface is formed in a lens, it is desirable that a lens having an aspherical surface is processed by the glass molding method.

When it has an aspherical surface, it is possible to form a lens in which an aspherical surface is to be formed, by using an organic-inorganic hybrid material. The organic-inorganic hybrid material is described, for example, in Japanese published unexamind patent application Toku Kai Hei No. 7-90181. The organic-inorganic hybrid material means a material in which an organic material is dispersed in an inorganic material, or a material in which an inorganic material is dispersed in an organic material. The melting point of an organic-inorganic hybrid material is low compared with glass, and accordingly it can be formed at a low temperature and can be produced in large quantities easily. By using such material, an optical system becomes cheap.

As for an organic-inorganic hybrid material, compared with a plastic, an optical property of high refracting index-low dispersion is obtained. It is excellent at heat resistance too. Furthermore, since it is hardly scratched, for example it can be used also for a front component in an optical system (an optical element which is arranged at utmost an object side). Therefore, at least, it is desirable to use such an organic-inorganic hybrid material for a lens having an aspherical surface.

When a lens has an aspherical surface, it is possible to use plastic as a raw material of the lens having an aspherical surface. When plastic material is used, the lens having an aspherical surface can be produced easily and in large quantities by plastic moulding. Moreover, since the cost of materials is cheap a cheap lens and a cheap optical system can be obtained. Moreover, since a plastic is light in comparison with glass, weight saving of an optical system can also be attained.

In the variable magnification optical system according to the present invention, it is possible to form all lenses with plastic. If all lenses are composed by plastic, all lenses can be produced by plastic moulding and can be produced in large quantities easily. Moreover, since the cost of materials is cheap, a cheap optical system can be attained.

Numerical data of the first embodiment are shown below. Here, f represents a focal length of whole system and 2ω is an angle of view, Fno is an F number, WE is a wide angle end, ST is a middle position and TE is—a telephoto end, and r1, r2 . . . represent a radius of curvature of each lens surface, and d1, d2 . . . represent a distance p between each-lens surface, and nd1, nd2 . . . represent a refracting index of each lens at d ray, nud1, nud2 . . . is Abbe number of each lens. A rotationally asymmetric aspherical surface is defined by the following formula:

(h is the distance from an optical axis.)

$$Z=ch^2/[1+\sqrt{\{1-(1+k)c^2h^2\}}]+Ah^4+Bh^6+Ch^8+Dh^{10}+\ldots$$

Here, c represents a curvature of the peak, k is a conic constant, A represents fourth order aspherical surface coefficients and B is sixth order aspherical surface coefficients and C is eighth order aspherical surface coefficients and D is tenth order aspherical surface coefficient.

In the right-hand system in which z-axis is made an optical axis, each of tilt, a center of which is X-axis, Y-axis and Z-axis is defined as α, β, γ (°), respectively. Positive directions of α and β means a counterclockwise rotation to the right direction of each axis, respectively. Positive direction of γ means a clockwise rotation to the positive direction of the z-axis.

A shift of the position of a surface from the origin of coordinates to X axis direction, Y axis direction or Z axis direction is set to X, Y and Z, respectively. The order of decentering is the order of X shift, Y shift, Z shift, α tilt, β tilt and γ tilt. The tilt around the X-axis only is shown in the embodiment.

These symbols hold for the numerical data of embodiments to be described later.

| | | Numerical data 1 | | | |
|---|---|---|---|---|---|
| Surface No. ($i$) | Radius curvature ($r_i$) | Surface distance (Air space) ($d_i$) | Decentering | Refraction Index ($n_i$) | Abbe's No. ($\nu d_i$) |
| Object surface | ∞ | ∞ | | | |
| 1 | Aspherical [1] | −4.18 | | 1.8467 | 23.8 |
| 2 | ∞ | 3.88 | Decentering (1) | 1.8467 | 23.8 |
| 3 | ∞ | 0.10 | | | |
| 4 | Aspherical [2] | 1.94 | | 1.7495 | 35.3 |
| 5 | −20.65 | 1.00 | | | |
| 6 | Aspherical [3] | 0.70 | | 1.7000 | 48.1 |
| 7 | Aspherical [4] | 0.79 | | | |
| 8 | 15.48 | 1.44 | | 1.7552 | 27.5 |
| 9 | −23.46 | 8.29 | | | |
| 10 | Aperture Stop | 0.10 | | | |
| 11 | 30.40 | 1.13 | | 1.4875 | 70.2 |
| 12 | −46.25 | 6.86 | | | |
| 13 | Aspherical [5] | 3.07 | | 1.4875 | 70.2 |
| 14 | −11.54 | 0.10 | | | |
| 15 | Aspherical [6] | 1.95 | | 1.5163 | 64.1 |
| 16 | −21.14 | 1.89 | | 1.7282 | 28.5 |
| 17 | 4.00 | 2.87 | | | |
| 18 | 12.33 | 1.53 | | 1.6031 | 60.6 |
| 19 | −14.86 | 1.00 | | | |
| 20 | ∞ | 0.00 | | | |
| 21 | ∞ | 0.10 | | 1.5163 | 64.1 |
| 22 | ∞ | 0.60 | | | |
| 23 | ∞ | 0.50 | | 1.5163 | 64.1 |
| 24 | ∞ | 1.04 | | | |
| Image surface (IMG) | ∞ | 0.00 | | | |

Aspherical [1]

Radius of curvature  $r_1 = 9.80$
$k = 0$
$A = -3.4025 \times 10^{-4}$   $B = -2.2640 \times 10^{-7}$   $C = 1.0953 \times 10^{-8}$ Aspherical [2]

Radius of curvature  $r_2 = 14.51$
$k = 0$
$A = -2.1901 \times 10^{-4}$   $B = 9.7085 \times 10^{-8}$   $C = 7.4441 \times 10^{-9}$ Aspherical [3]

Radius of curvature  $r_3 = -7.52$
$k = 0$
$A = 5.2340 \times 10^{-4}$   $B = 1.4142 \times 10^{-5}$   $C = -2.1045 \times 10^{-8}$ Aspherical [4]

Radius of curvature  $r_4 = 6.70$
$k = 0$
$A = -7.7041 \times 10^{-4}$   $B = 1.0353 \times 10^{-5}$   $C = 2.8905 \times 10^{-7}$ Aspherical [5]

Radius of curvature  $r_5 = 6.31$
$k = 0$
$A = -5.9344 \times 10^{-4}$   $B = -1.6321 \times 10^{-5}$   $C = -3.5256 \times 10^{-7}$ Aspherical [6]

Radius of curvature  $r_6 = 8.32$
$k = 0$
$A = -2.9810 \times 10^{-4}$   $B = 3.4617 \times 10^{-6}$   $C = 1.3142 \times 10^{-6}$ Decentering [1]

| X | 0.00 | Y | 0.00 | Z | 0.00 |
|---|---|---|---|---|---|
| α | −45.00 | β | 0.00 | γ | 0.00 |

-continued

Numerical data 1

Zoom data (infinite object point)

|  | Wide angle end (WE) | Middle position (ST) | Telephoto end (TE) |
|---|---|---|---|
| f (mm) | 4.10 | 6.94 | 11.72 |
| Fno | 2.86 | 3.51 | 4.38 |
| 2 ω (°) | 78.73 | 45.21 | 26.24 |
| D (surface distnce) | 1.00 | 5.96 | 8.29 |
| d9 | 8.29 | 3.33 | 1.00 |
| d12 | 6.86 | 4.70 | 1.00 |
| d17 | 2.87 | 4.68 | 8.74 |
| d19 | 1.00 | 1.36 | 1.00 |

[The Second Embodiment]

Hereafter, the second embodiment of the present invention will be explained using drawings.

Figure 2B:
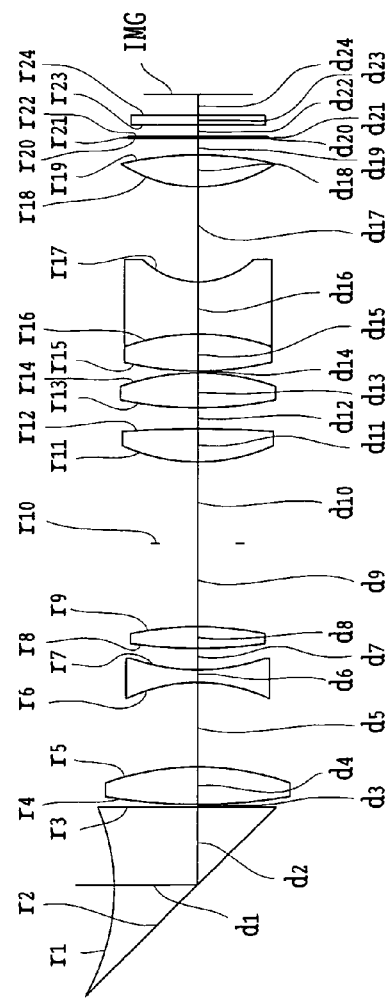
Figure 2C:
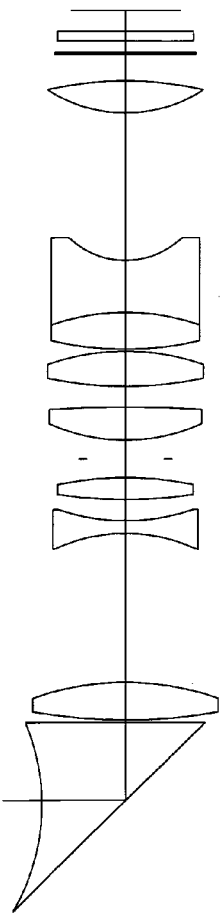

FIG. 2 shows a sectional view showing a light path reflecting optical system of the present invention. FIG. 2A is a sectional view showing the optical system at a wide angle end telephoto end at the time of focusing at the infinite object point. FIG. 2B is a sectional view showing the optical system at a middle position at the time of focusing at the infinite object point. FIG. 2C is a sectional view showing the optical system at a telephoto end at the time of focusing at the infinite object point.

As shown in FIGS. 2, the imaging optical system of the second embodiment has, in order from an object side, a first lens group G21 which has positive refracting power, the second lens group G22 which has negative refracting power, the third lens group G23 which has positive refracting power and the fourth lens group G24 which has positive refracting power. An aperture stop S is arranged between the second lens group G22 and the third lens group G23. Furthermore, a parallel plane board group F2, which is an optical element, is arranged between the last lens group G24 and the imaging surface IMG. For example, F21 is a near-infrared cut filter, F22 is an optical low pass filter, and F33 is a cover glass of a CCD.

The first lens group G21 consists of an optical element L21 having negative refracting power, and a lens L22 having biconvex surfaces. The optical element L21 is a light path reflecting element, and has a lens surface having negative refracting power, the concave surface of which is directed toward the object side. Moreover, the optical element L21 has a reflecting optical surface RF for reflecting a light path, and also has a function as a reflecting prism for reflecting the light path by 90°. The second lens group G22 is composed of, in order from the object side, a double concave lens L13 and a double convex lens L24. The third lens group G23 is composed of a double convex lens L25, a double convex lens L26, a double convex lens L27 and a double concave lens L28. The above-mentioned lens L27 and the lens L28 are cemented. The fourth lens group G24 is composed of a double convex le ns L29. An aperture stop S is arranged between a the second lens group G22 and the third lens group G23.

When magnification is changed from a wide angle end to a telephoto end, each lens group is performed as follows. The second lens group G22 moves toward the image side so that a distance to the third lens group G23 may be narrowed. The third lens group G23 moves along the optical axis toward an the object side so that a distance to the second lens group G22 may be narrowed. The fourth lens group G24 moves to the image side when magnification changes from the wide angle end to the middle positon. and it moves to the object side when magnification changes from the middle positon to the telephoto end.

The positions of the first lens group G21 and the aperture stop S remain fixed to the imaging surface IMG.

As to an aspherical surface, an entrance surface of the optical element L21, an object side surface and an image side surface of the lens L23, a surface at utmost object side of the lens L25, and a surface at utmost object side of the cemented lens 27 are aspherical.

In this embodiment, although the value of telephoto focal length/wide angle focal length is 2.9 times, wider angle of view and higher magnification such that a value of wide angle of view/telephoto angle of view is three times have been achieved, by generating negative image distortion at the wide angle end. And an image distortion generated accompanied with increasing of angle of view and magnification is corrected electrically.

Numerical data 2

| Surface No. ($i$) | Radius curvature ($r_i$) | Surface distance (Air space) ($d_i$) | Decentering | Refraction Index ($n_i$) | Abbe's No. ($v\, d_i$) |
|---|---|---|---|---|---|
| Object surface | ∞ | ∞ | | | |
| 1 | Aspherical [1] | −4.25 | | 1.8467 | 23.8 |
| 2 | ∞ | 4.10 | Decentering (1) | 1.8467 | 23.8 |

-continued

Numerical data 2

| | | | | |
|---|---|---|---|---|
| 3 | ∞ | 0.10 | | |
| 4 | Aspherical [2] | 1.96 | 1.7495 | 35.3 |
| 5 | −13.68 | 1.00 | | |
| 6 | Aspherical [3] | 0.70 | 1.7440 | 44.8 |
| 7 | Aspherical [4] | 1.10 | | |
| 8 | 20.91 | 1.13 | 1.7552 | 27.5 |
| 9 | −18.83 | 7.75 | | |
| 10 | Aperture Stop Surface | 7.26 | | |
| 11 | Aspherical [5] | 1.73 | 1.4875 | 70.2 |
| 12 | −63.54 | 1.08 | | |
| 13 | 18.33 | 1.80 | 1.4875 | 70.2 |
| 14 | −12.12 | 0.10 | | |
| 15 | Aspherical [6] | 1.93 | 1.6204 | 60.3 |
| 16 | −11.42 | 2.71 | 1.6989 | 30.1 |
| 17 | 4.02 | 1.11 | | |
| 18 | 7.22 | 1.62 | 1.4875 | 70.2 |
| 19 | −20.57 | 1.67 | | |
| 20 | ∞ | 0.00 | 1.6779 | 31.6 |
| 21 | ∞ | 0.10 | 1.5163 | 64.1 |
| 22 | ∞ | 0.60 | | |
| 23 | ∞ | 0.50 | 1.5163 | 64.1 |
| 24 | ∞ | 1.04 | | |
| Image surface (IMG) | ∞ | 0.00 | | |

Aspherical [1]

Radius of curvature $r_1 = 10.02$
$k = 0$
$A = -3.1608 \times 10^{-4}$  $B = 6.1735 \times 10^{-7}$  $C = 4.5767 \times 10^{-9}$ Asherical [2]

Radius of curvature $r_2 = 23.56$
$k = 0$
$A = -2.0079 \times 10^{-4}$  $B = -9.3110 \times 10^{-8}$  $C = 1.0294 \times 10^{-8}$ Asherical [3]

Radius of curvature $r_3 = -7.80$
$k = 0$
$A = 5.7738 \times 10^{-4}$  $B = 6.1928 \times 10^{-6}$  $C = 3.8289 \times 10^{-7}$ Asherical [4]

Radius of curvature $r_4 = 9.64$
$k = 0$
$A = -1.2116 \times 10^{-4}$  $B = 2.4022 \times 10^{-7}$  $C = 1.1537 \times 10^{-6}$ Asherical [5]

Radius of curvature $r_5 = 7.84$
$k = 0$
$A = -5.9238 \times 10^{-4}$  $B = -4.7973 \times 10^{-6}$  $C = -2.0809 \times 10^{-7}$ Asherical [6]

Radius of curvature $r_6 = 15.54$
$k = 0$
$A = -1.5057 \times 10^{-4}$  $B = 2.5950 \times 10^{-6}$  $C = 4.1292e \times 10^{-7}$ Decentering [1]

| X | 0.00 | Y | 0.00 | Z | 0.00 |
|---|---|---|---|---|---|
| α | −45.00 | β | 0.00 | γ | 0.00 |

Zoom data (infinite object point)

| | Wide angle end (WE) | Middle position (ST) | Telephoto end (TE) |
|---|---|---|---|
| f (mm) | 4.10 | 6.98 | 11.90 |
| Fno | 2.86 | 3.51 | 4.38 |
| 2 ω (°) | 78.73 | 45.21 | 26.24 |
| D5 (surface distance) | 1.00 | 4.31 | 7.75 |
| d9 | 7.75 | 4.44 | 1.00 |
| d10 | 7.26 | 4.27 | 1.00 |
| d17 | 1.11 | 4.77 | 7.67 |
| d19 | 1.67 | 1.00 | 1.37 |

[The Third Embodiment]

Hereafter, the third embodiment of the present invention will be explained using drawings.

Figures 3A, 3B, 3C:
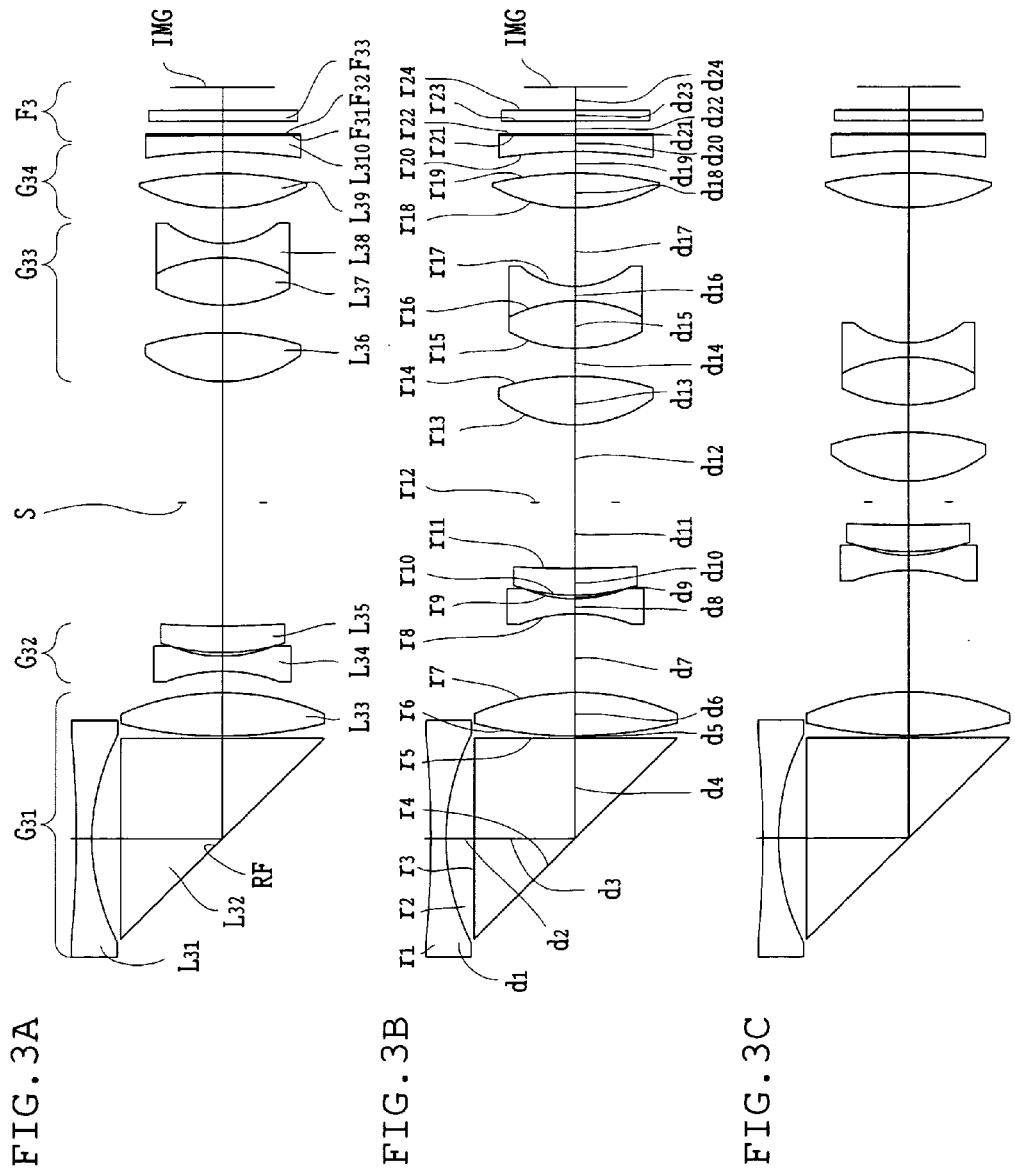
FIGS. 3A, 3B and 3C are sectional views showing a light path reflecting optical system at a wide angle end, a middle position and a telephoto end respectively, in a third embodiment according to the present invention.

FIG. 3 shows a sectional view showing a light path reflecting optical system of the present invention. FIG. 3A is a sectional view showing the optical system at a wide angle end telephoto end at the time of focusing at the infinite object point. FIG. 3B is a sectional view showing the optical system at a middle position at the time of focusing at the infinite object point. FIG. 3C is a sectional view showing the optical system at a telephoto end at the time of focusing at the infinite object point.

As shown in FIG. 3, the imaging optical system of the third embodiment has, in order from an object side, a first lens group G31 which has positive refracting power, the second lens group G32 which has negative refracting power, the third lens group G33 which has positive refracting power, and the fourth lens group G34 which has positive refracting power. An aperture stop S is arranged between the second lens group G32 and the third lens group G33. A parallel plane board group F3, which is an optical element, is arranged on the image side of the last lens group G34. For example, F31 is a near-infrared cut filter, F32 is an optical low pass filter and F33 is a cover glass of a CCD.

The first lens group G31 is composed of a double concave lens L31, an optical element L32, and a double convex lens L33. The optical element L32 is a light path reflecting element, and has a reflecting optical surface RF having a function as a prism for reflecting a light path by 90°. The second lens group G32 is composed of, in order from the object side, a double concave lens L34 and a positive meniscus lens L35 having a convex surface directed toward the object side. The third lens group G33 is composed of a double convex lens L36, a double convex lens L37, and a double concave lens L38. The lens L37 and the lens L38 are cemented together. The fourth lens group G34 is composed of a double convex lens L39 and a plano-concave lens L310. Moreover, an aperture stop S is arranged between the second lens group G32 and the third lens group G33. The aperture stop S remains fixed when magnification is changed.

When magnification is changed from the wide angle end to the telephoto end, each lens group behaves as follows. The second lens group G32 moves toward the image side so that a distance to the third lens group G33 is narrowed. The third lens group G33 moves along the optical axis toward the object side so that a distance to the second lens group G32 is narrowed.

The positions of the first lens group G31, the aperture stop S and the fourth lens group G34 remain fixed in reference to an imaging surface IMG.

As to aspherical surfaces, both surfaces of the optical element L31, an object side surface of the lens L33, an object side surface of the lens L36, and the utmost object-side surface of the cemented lens composed of L37 and L38 are aspherical.

In this embodiment, although the value of telephoto focal length/wide angle focal length is 2.98 times, wider angle of view, and higher magnification such that the value of wide angle of view/telephoto angle of view is three times, have been achieved, by generating negative image distortion at the wide angle end. And the an image distortion generated accompanied with increasing angle of view and magnification is corrected electrically.

| Numerical data 3 | | | | | |
|---|---|---|---|---|---|
| Surface No. ($i$) | Radius curvature ($r_i$) | Surface distance (Air space) ($d_i$) | Decentering | Refraction Index ($n_i$) | Abbe's No. ($\nu d_i$) |
| Object surface | ∞ | ∞ | | | |
| 1 | Asherical [1] | −0.70 | | 1.8467 | 23.8 |
| 2 | Asherical [2] | −0.84 | | | |
| 3 | ∞ | −4.60 | | 1.8467 | 23.8 |
| 4 | ∞ | 4.60 | Decentering (1) | 1.8467 | 23.8 |
| 5 | ∞ | 0.10 | | | |
| 6 | Aspherical [3] | 2.02 | | 1.7200 | 46.0 |
| 7 | −11.23 | 1.00 | | | |
| 8 | Aspherical [4] | 0.70 | | 1.6204 | 60.3 |
| 9 | Aspherical [5] | 0.16 | | | |
| 10 | 8.66 | 1.27 | | 1.7552 | 27.5 |
| 11 | 47.60 | 5.63 | | | |
| 12 | Aperture Stop | 5.58 | | | |
| 13 | Aspherical [6] | 2.23 | | 1.5163 | 64.1 |
| 14 | −12.99 | 1.29 | | | |
| 15 | Aspherical [7] | 2.20 | | 1.4875 | 70.2 |
| 16 | −6.53 | 0.70 | | 1.7552 | 27.5 |
| 17 | 3.81 | 1.64 | | | |
| 18 | 7.56 | 1.55 | | 1.5814 | 40.7 |
| 19 | −17.19 | 1.00 | | | |
| 20 | −26.36 | 0.70 | | 1.4875 | 70.2 |
| 21 | ∞ | 0.10 | | 1.5163 | 64.1 |
| 22 | ∞ | 0.60 | | | |
| 23 | ∞ | 0.50 | | 1.5163 | 64.1 |
| 24 | ∞ | 1.04 | | | |
| Image surface (IMG) | ∞ | 0.00 | | | |

-continued

Numerical data 3

Aspherical [1]

Radius of curvature   $r_1 = 47.34$
$k = 0$
$A = 1.0521 \times 10^{-4}$    $B = -6.3951 \times 10^{-6}$    $C = 8.3454 \times 10^{-8}$ Aspherical [2]

Radius of curvature   $r_2 = -12.04$
$k = 0$
$A = 3.7680 \times 10^{-5}$    $B = -7.9299 \times 10^{-6}$    $C = -7.9253 \times 10^{-8}$ Aspherical [3]

Radius of curvature   $r_3 = 16.43$
$k = 0$
$A = -1.8586 \times 10^{-4}$    $B = -8.9933 \times 10^{-7}$    $C = 1.9689 \times 10^{-8}$ Aspherical [4]

Radius of curvature   $r_4 = 15.54$
$k = 0$
$A = 5.8258 \times 10^{-4}$    $B = 3.6669 \times 10^{-5}$    $C = -7.3341e \times 10^{-7}$ Aspherical [5]

Radius of curvature   $r_5 = 5.77$
$k = 0$
$A = -8.9229 \times 10^{-4}$    $B = 3.1685 \times 10^{-5}$    $C = 8.4797 \times 10^{-7}$ Aspherical [6]

Radius of curvature   $r_6 = 5.03$
$k = 0$
$A = -9.0568 \times 10^{-4}$    $B = -1.7113 \times 10^{-5}$    $C = -1.1827 \times 10^{-6}$ Aspherical [7]

Radius of curvature   $r_7 = 5.73$
$k = 0$
$A = -6.5787 \times 10^{-4}$    $B = -2.8480 \times 10^{-5}$    $C = 1.8738 \times 10^{-6}$ Decentering [1]

| X | 0.00 | Y | 0.00 | Z | 0.00 |
|---|---|---|---|---|---|
| α | −45.00 | β | 0.00 | γ | 0.00 |

Zoom data (infinite object point)

|  | Wide angle end (WE) | Middle position (ST) | Telephoto end (TE) |
|---|---|---|---|
| f (mm) | 4.10 | 7.09 | 12.25 |
| Fno | 2.86 | 3.51 | 4.38 |
| 2 ω (°) | 73.49 | 43.23 | 24.77 |
| d7 (surface distance) | 1.00 | 3.63 | 5.63 |
| d11 | 5.63 | 3.00 | 1.00 |
| d12 | 5.58 | 3.59 | 1.00 |
| d17 | 1.64 | 3.63 | 6.22 |

[The Fourth Embodiment]

Hereafter, the fourth embodiment of the present invention will be explained using drawings.

FIG. 4 shows a sectional view showing a light path reflecting optical system of the present invention. FIG. 4A is a sectional view showing the optical system at a wide angle end telephoto end at the time of focusing at the infinite object point. FIG. 4B is a sectional view showing the optical system at a middle position at the time of focusing at the infinite object point. FIG. 4C is a sectional view showing the optical system at a telephoto end at the time of focusing at the infinite object point.

As shown in FIG. 4, the imaging optical system of the fourth embodiment has, in order from an object side, a first lens group G41 which has positive refracting power, the second lens group G42 which has negative refracting power, the third lens group G43 which has positive refracting power, and the fourth lens group G44 which has positive refracting power. An aperture stop S is arranged between the second lens group G42 and the third lens group G43 A parallel plane board group F3 which is an optical element is arranged between the image side of the fourth lens group G44 and the an imaging surface IMG. For example, F41 is a near-infrared cut filter, F42 is an optical low pass filter and F42 is a cover glass of CCD.

The first lens group G41 consists of a double concave lens L31, an optical element L42, a double convex lens L43. The optical element L42 is a light path reflecting element, and has a reflecting optical surface RF having a function as a prism for reflecting a light path by 90°. The second lens group G42 is composed of, in order from the object side, a double concave lens L34 and a positive meniscus lens L45 having a convex surface directed toward the object side. The third lens group G43 consists of a double convex lens L46.

The fourth lens group G44 consists of a double convex lens L47 and a double concave lens L48. The above-mentioned lens L47 and the lens L48 are cemented. Moreover, an aperture stop S is arranged between the second lens group G42 and the third lens group G43.

When magnification is changed from a wide angle end to a telephoto end, each lens group is performed as follows. The second lens group G42 moves toward the image side so that a distance to the third lens group G43 may be narrowed. The third lens group G43 moves along the optical axis toward an the object side so that a distance to the second lens group G42 may be narrowed.

When magnification is changed, positions of the first lens group G41, the aperture stop S and the fourth lens group G44 remain fixed to the imaging surface IMG.

As to an aspherical surface, both surfaces the optical element L41, an object side surface of the lens L43, an object side surface of the lens L46, and a surface at utmost object side of the cemented lens L47 are aspherical.

Numerical data 4

| Surface No. ($_i$) | Radius curvature ($r_i$) | Surface distance (Air space) ($d_i$) | Decentering | Refraction Index ($n_i$) | Abbe's No. ($\nu d_i$) |
|---|---|---|---|---|---|
| Object surface | ∞ | ∞ | | | |
| 1 | Aspherical [1] | −0.70 | | 1.8467 | 23.8 |
| 2 | Aspherical [2] | −1.08 | | | |
| 3 | ∞ | −4.60 | | 1.8467 | 23.8 |
| 4 | ∞ | 4.60 | Decentering (1) | 1.8467 | 23.8 |
| 5 | ∞ | 0.10 | | | |
| 6 | Aspherical [3] | 2.06 | | 1.7620 | 40.1 |
| 7 | −10.58 | 1.00 | | | |
| 8 | Aspherical [4] | 0.70 | | 1.6204 | 60.3 |
| 9 | 8.50 | 1.26 | | 1.7552 | 27.5 |
| 10 | 17.30 | 7.79 | | | |
| 11 | Aperture Stop Surface | 5.70 | | | |
| 12 | Aspherical [5] | 3.26 | | 1.4875 | 70.2 |
| 13 | −12.81 | 0.24 | | | |
| 14 | Aspherical [6] | 3.52 | | 1.4875 | 70.2 |
| 15 | −4.94 | 0.70 | | 1.7552 | 27.5 |
| 16 | 3.94 | 1.18 | | | |
| 17 | 6.93 | 1.42 | | 1.6668 | 33.1 |
| 18 | −52.65 | 1.16 | | | |
| 19 | ∞ | 0.16 | | | |
| 20 | ∞ | 0.10 | | 1.5163 | 64.1 |
| 21 | ∞ | 0.60 | | | |
| 22 | ∞ | 0.50 | | 1.5163 | 64.1 |
| 23 | ∞ | 1.04 | | | |
| Image surface (IMG) | ∞ | 0.00 | | | |

Aspherical [1]

Radius of curvature $r_1 = 525.35$
$k = 0$
$A = 2.8917 \times 10^{-4}$  $B = -5.5062 \times 10^{-6}$  $C = 3.3711 \times 10^{-8}$ Aspherical [2]

Radius of curvature $r_2 = -8.83$
$k = 0$
$A = 1.7221 \times 10^{-4}$  $B = -4.1469e- \times 10^{-6}$  $C = -1.7618 \times 10^{-7}$ Aspherical [3]

Radius of curvature $r_3 = 34.74$
$k = 0$
$A = -6.2004 \times 10^{-5}$  $B = -6.2178 \times 10^{-7}$  $C = 1.6587 \times 10^{-8}$ Aspherical [4]

Radius of curvature $r_4 = -10.04$
$k = 0$
$A = 2.2669 \times 10^{-4}$  $B = -2.6936 \times 10^{-7}$  $C = -7.9278 \times 10^{-9}$ Aspherical [5]

Radius of curvature $r_5 = 4.99$
$k = 0$
$A = -7.6279 \times 10^{-4}$  $B = -1.4496 \times 10^{-5}$  $C = -1.1231 \times 10^{-6}$ -continued Numerical data 4

Aspherical [6]

Radius of curvature  $r_6 = 7.51$
k = 0
$A = -5.6762 \times 10^{-4}$   $B = -1.9175 \times 10^{-5}$   $C = 4.6853 \times 10^{-7}$ Decentering [1]

| X | 0.00 | Y | 0.00 | Z | 0.00 |
|---|------|---|------|---|------|
| α | −45.00 | β | 0.00 | γ | 0.00 |

Zoom data (infinite object point)

|  | Wide angle end (WE) | Middle position (ST) | Telephoto end (TE) |
|---|---|---|---|
| f (mm) | 3.33 | 7.13 | 12.40 |
| Fno | 2.80 | 3.57 | 4.82 |
| 2 ω (°) | 71.9 | 42.3 | 24.3 |
| d7 (surface distance) | 1.00 | 4.79 | 7.79 |
| d11 | 7.79 | 4.00 | 1.00 |
| d12 | 5.70 | 3.64 | 1.00 |
| d17 | 1.18 | 3.24 | 5.88 |

The light path reflecting optical system according to the present inventions can be used for a photographing apparatus in which a photographing is carried out by forming an object image using an image forming optical system and such image is received on an imaging element such as a CCD or a silver-haloid film, particularly a digital camera, a video camera and a personal computer as an example of an information processing equipment, a telephone, particularly a cellular phone convenient to carry and the like. Examples of such use will be illustrated as follows.

Figure 9:
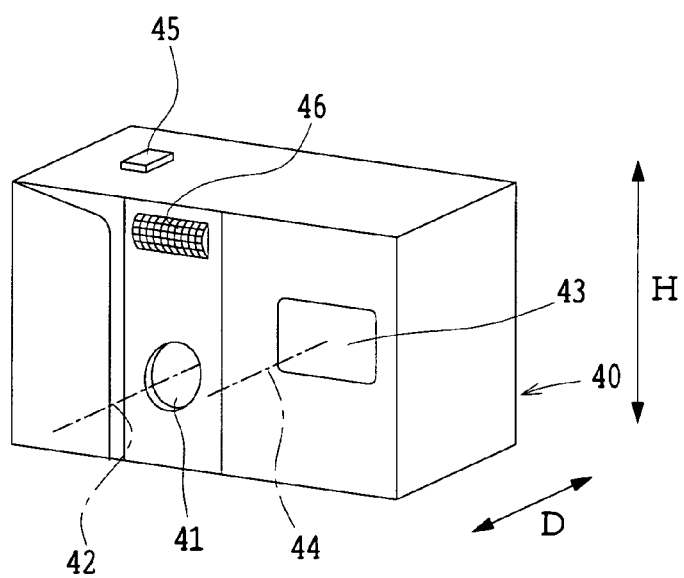
FIG. 9 is a front perspective view showing a digital camera embodied by a light path reflecting optical system according to the present invention.
Figure 10:
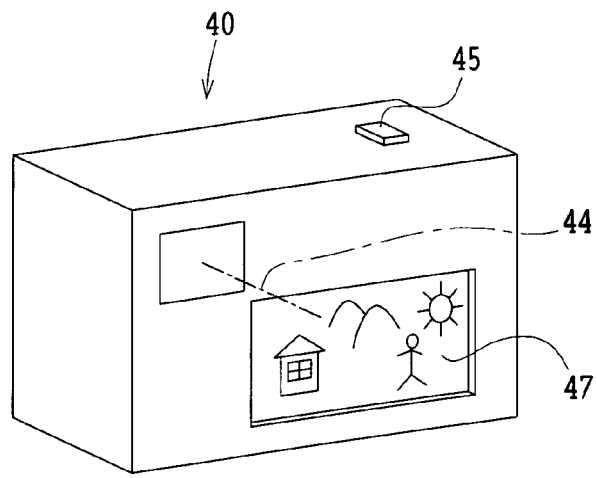
FIG. 10 is a rear perspective view showing a digital camera shown in FIG. 9.
Figure 11:
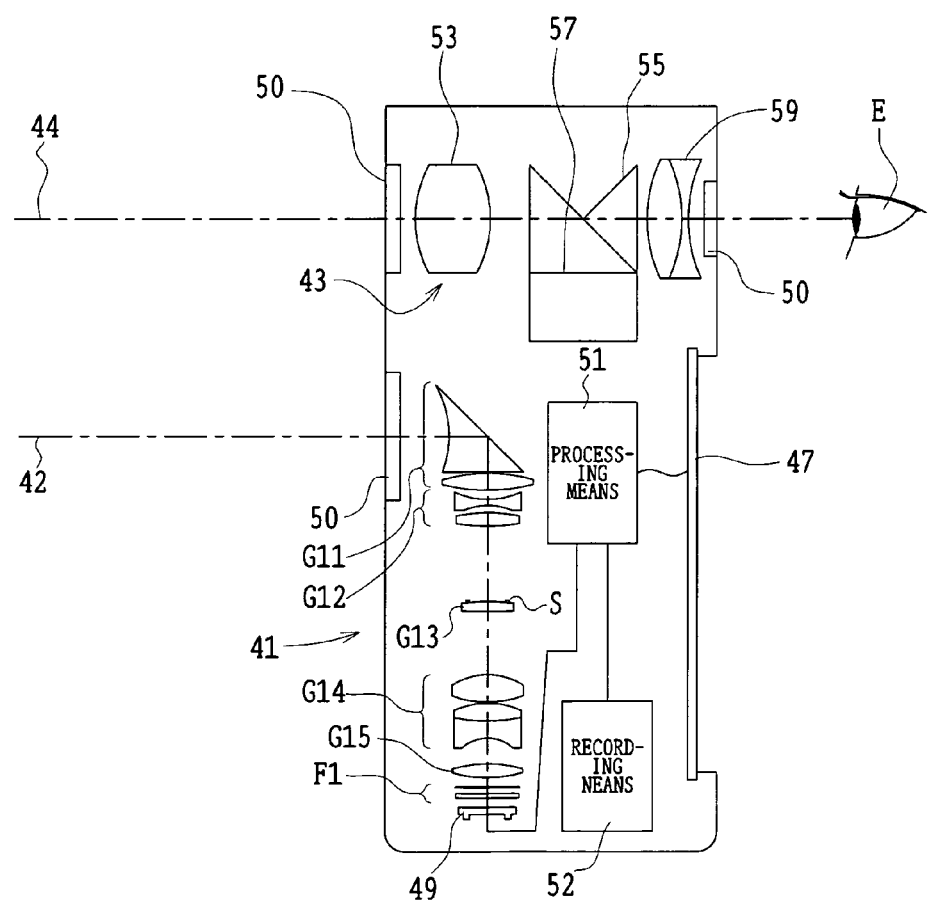
FIG. 11 is a sectional view of the camera in FIG. 9.

FIGS. 9 to 15 are conceptual diagrams showing compositions of the light path reflecting optical system according to the present invention is built in a photographing optical system 41 of a digital camera. FIG. 9 is a front perspective view showing a digital camera 40. FIG. 10 is a rear perspective view showing the same. FIG. 11 is a sectional view showing composition of the camera 40.

In this example, the digital camera 40 includes the photographing optical system 41 having a light path for photographing 42, the finder optical system 43 having a light path for finder 44, a shutter 45, a flash 46 and liquid-crystal-display monitor 47 and so on. When the shutter 45 arranged at the upper part of the camera 40 is pressed, by interlocking it, photographing is carried out through the photographing optical system 41, for example, the light path reflecting zoom lens of the first embodiment.

Then, an object image formed by the photographing optical system 41 is formed on an imaging surface of CCD 49 through a near-infrared cut coat given to a near-infrared cut filter, a CCD cover glass or other lenses.

The object image received by this CCD 49 is displayed on the liquid crystal display monitor 47 arranged on the camera back as an electronic picture through the processing means 51. The record means 52 is connected to this processing means 51, and a photographed electronic picture can also be recorded on it. This record means 52 may be formed separately from the processing means 51, and it can be composed such that record writing can be carried out electronically by using a disk such as a flexible disk, a memory card, MO, etc. Moreover, it may be composed as a film-based camera using a silver halide film instead of the CCD 49.

Furthermore, on the light path 44 for the finder, an object optical system 53 for the finder is arranged. An object image formed by this object optical system 53 for the finder is formed on a visual field frame 57 of a Porro prism 55 which is an component for erecting image. Behind this Porro prism 55, an ocular optical system 59 in which an image formed into an erect image is lead to the observer's eyeball E is arranged. Cover members 50 are arranged a t an incidence side of the photographing optical system 41 and the object optical system 53 for finder and at an exit side of an ocular optical system 59 respectively.

In the digital camera 40 composed in this way, a zoom lens is composed such that the photographing optical system 41 has a high zooming ratio and a wide angle of view and it has good aberration, bright imaging performance and a long back focus where a filter or the like can be arranged. Accordingly and cost reduction with a high efficiency can be realized.

In the example of FIG. 11, although parallel plane boards are arranged as the cover members 50, a lens having power can be used.

Figure 12:
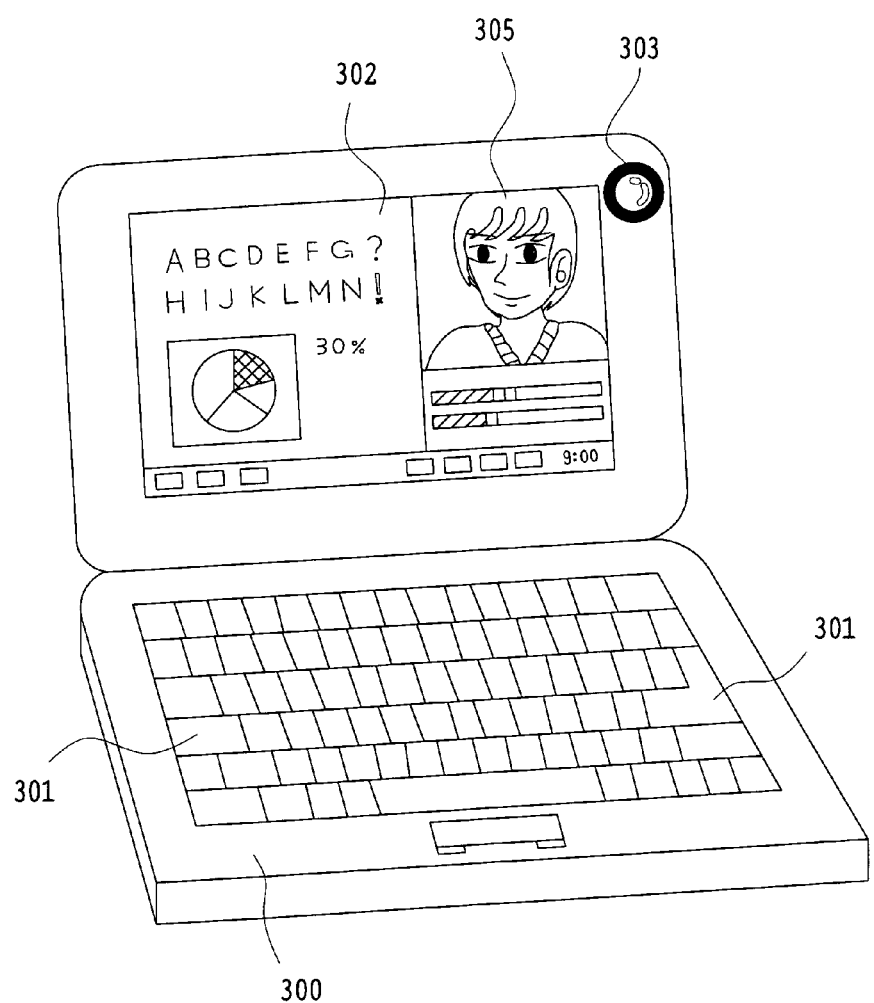
FIG. 12 is a front perspective view showing a personal computer, a cover of which is opened, embodied by light path optical system according to the present invention.
Figure 13:
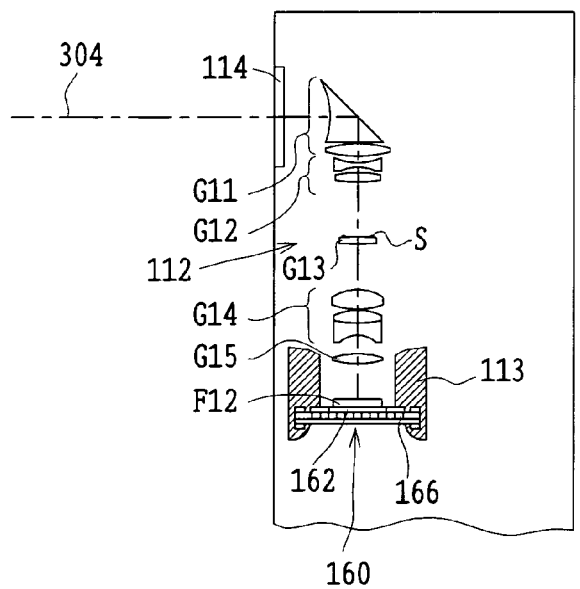
FIG. 13 is a sectional view showing a photographing optical system of a personal computer.
Figure 14:
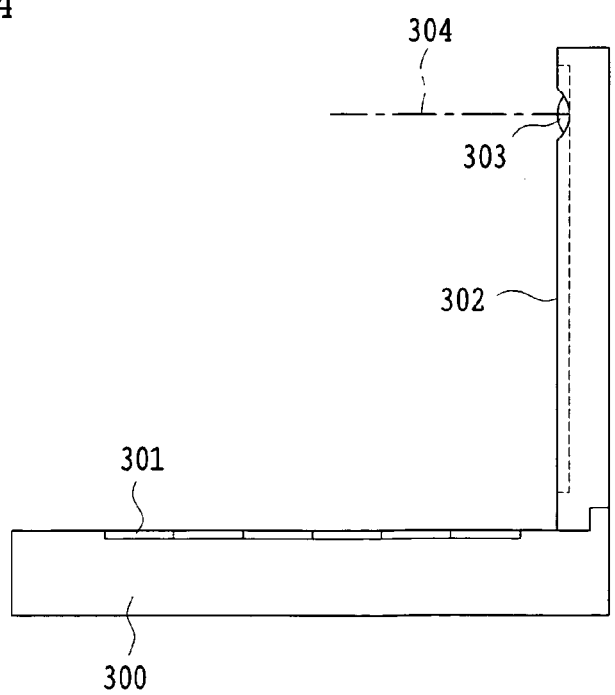
FIG. 14 is a side view showing a personal computer.

Next, a personal computer as an example of an information processing equipment in which the zoom lens having a light path reflecting optical system according to the present invention is built in as an objective optical system is shown in FIGS. 12 to 14. FIG. 12 is a front perspective view showing a personal computer, a cover of which is opened, FIG. 13 is a sectional view showing a photographing optical system 303 of the personal computer 300 and FIG. 14 is a side view of FIG. 12.

As shown in FIGS. 11 to 13, the personal computer 300 has a keyboard 301 for an operator to input information from the exterior, an information processing means and a record means, an illustration of which was omitted, a monitor 302 for displaying information to the operator, and a photographing optical system 303 for taking photograph of the operator by himself and a surrounding image. Here, the monitor 302 can be a penetration type-liquid-crystal-display element illuminated from the backward by the back light which is not illustrated, a reflection type liquid-crystal display element which displays by reflecting the light from frontward, CRT display, etc. In these drawings, although the photographing optical system 303 is built in upper right portion of the monitor 302, it may be arranged at not only the place mentioned above but also any portion around the monitor 302 and around the keyboard 301.

This photographing optical system 303 has, for example, an objective lens 112 composed of a zoom lens having a light path reflecting optical system according to the present invention and an imaging element chip 162 for receiving an image, on the photographing light path 304. These are built in the personal computer 300.

Here, on the imaging element chip 162, an optical low pass filter F12 is stuck additionally, which is formed in one as an imaging unit 160, and it is inserted in the back edge of a lens holding frame 113 of the objective lens 112 by one-touch function, and attaching becomes possible. Thus, centering of the objective lens 112 and the imaging element chip 162, and adjustment of distance between surfaces are unnecessary, and assembling becomes simple. Moreover, a cover glass 114 for protecting the objective lens 112 is arranged at the tip (illustration is omitted) of the lens holding frame 113. As to the drive mechanism of the zoom lens etc, in the lens holding frame 113, an illustration is omitted.

An object image received by the imaging element chip 162 is inputted via a terminal 166 into a processing means of the personal computer 300, and it is displayed on the monitor 302 as an electronic picture. In FIG. 12, a picture 305 in which an operator was photographed is shown as an example. This picture 305 can be displayed, through a processing means, on a personal computer of a communication partner from a remote place through Internet or telephone.

Figure 15A:
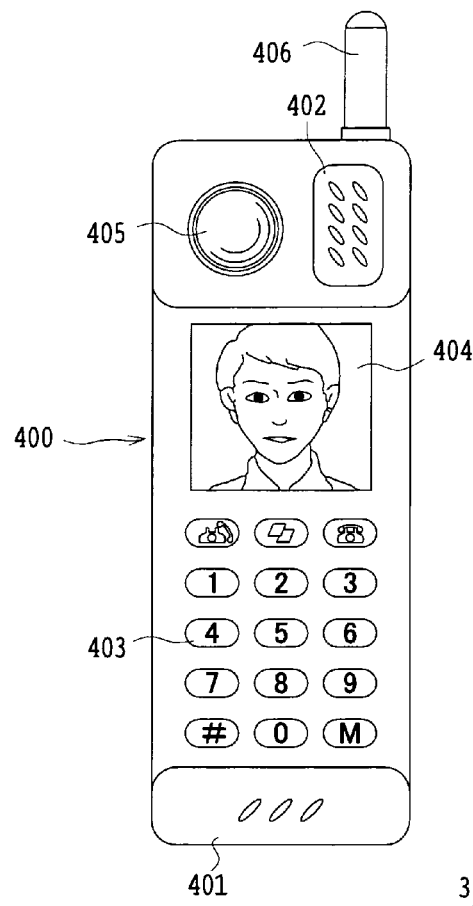
FIGS. 15A, 15B and 15C are an example of a cellular phone embodied by a light path reflecting optical system, showing a front view and a side view, and a sectional view showing a photographing optical system, respectively, according to the present invention.
Figure 15B:
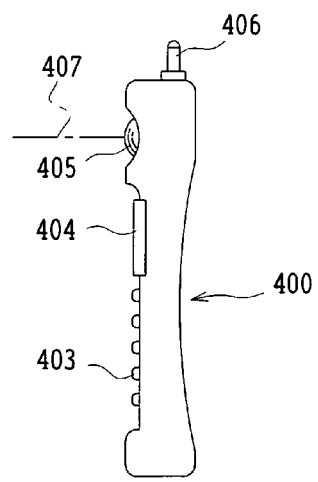
Figure 15C:
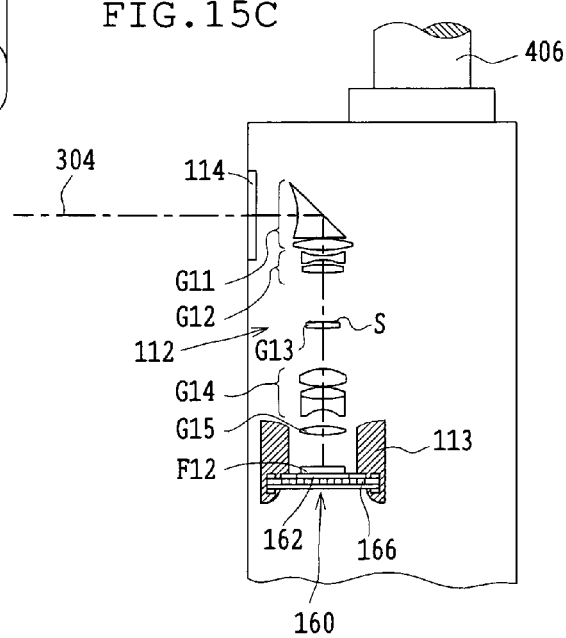

Next, a telephone, as an example of the information processing equipment in which the zoom lens having a light path reflecting optical system according to the present invention is built in, particularly a cellular phone that is convenient to carry is shown in FIG. 15. FIG. 15A is a front view of the cellular phone 400, FIG. 14B is a side view of the same and FIG. 14C is a sectional view of a photographing optical system 405.

As shown in FIG. 15, a cellular phone 400 includes a microphone section 401 which inputs an operator's voice as information, a speaker section 402 which outputs a partner's voice of telephone communication, an input dial 403 for which the operator inputs information, a monitor 404 which displays information, such as the photographed picture of the operator himself, a partner of telephone communication etc., and a telephone number, a photographing optical system 405, an antenna 406 which performs transmission and receiving a communication electric wave, and a processing means (not shown) to process picture information, communication information, an incoming signal, etc. Here, the monitor 404 is a liquid-crystal-display element. In these drawings, an arrangement position of each composition is not restricted particularly to these. This photographing optical system 405 has, for example, the objective lens 112 composed of the zoom lens having a light path reflecting optical system according to the present invention, which is arranged on the photographing light path 407, and the imaging element chip 162 which receives a light of an object image. These are built in the cellular phone 400.

Here, on the imaging element chip 162, a cover glass CG is stuck additionally, which is formed in one as an imaging unit 160, and it is inserted in the back edge of a lens holding frame 113 of the objective lens 112 by one-touch function, and attaching becomes possible. Thus, centering of the objective lens 112 and the imaging element chip 162, and adjustment of distance between surfaces are unnecessary, and assembling becomes simple. Moreover, a cover glass 114 for protecting the objective lens 112 is arranged at the tip (illustration is omitted) of the lens holding frame 113. As to the drive mechanism of the zoom lens etc., in the lens holding frame 113, illustration is omitted. An object image received by the photographing element chip 162 is inputted into a processing means which is not illustrated through the terminal 166, and it is displayed as an electronic picture on the monitor 404, a monitor of a communication partner or both of them. When transmitting an image to the communication partner, the signal-processing function to convert a data on the object image received by the imaging element chip 162 into a signal which can be transmitted is included in the processing means.

What is claimed is:

1. An optical system having an element that reflects a light path, comprising, at least, in order from an object side,
   a first lens group having positive refracting power, a second lens group having negative refracting power, a third lens group having positive refracting power, and a fourth lens group having positive refracting power,
   wherein at least, the second lens group and the fourth lens group move along an optical axis when magnification changes from a wide angle end to a telephoto end,
   wherein the element that reflects a light path is included in the first lens group and
   has refracting power, and wherein the fourth lens group comprises two or more lens components.

2. An optical system having an element that reflects a light path, comprising,
   at least, in order from an object side, a first lens group having positive refracting power, a second lens group having negative refracting power, a third lens group having positive refracting power, and a fourth lens group having positive refracting power,
   wherein at least, the second lens group and the fourth lens group move along an optical axis when magnification changes from a wide angle end to a telephoto end,
   wherein the element which reflects a light path is included in the first lens group, and
   wherein the fourth lens group comprises two or more lens elements having positive refracting power.

3. An optical system having an element that reflects a light path comprising,
   at least, in order from an object side, a first lens group having positive refracting power, a second lens group having negative refracting power, and a third lens group having positive refracting power,
   wherein at least, the second lens group and the third lens group move along an optical axis when magnification changes from a wide angle end to a telephoto end,
   wherein the element that reflects a light path is included in the first lens group, and
   wherein the third lens group comprises three or more lens elements having positive refracting power.

4. An optical system having an element that reflects a light path comprising,
   at least, in order from an object side, a first lens group having positive refracting power, a second lens group having negative refracting power, and a third lens group having positive refracting power, wherein at least, the second lens group and the third lens group move along an optical axis when magnification changes from a wide angle end to a telephoto end, and wherein the first lens group comprises, in order from the object side, a double concave lens element having negative refracting power, the element that reflects a light path, and a convex lens element.

5. The optical system according to claim 1, wherein the element that reflects a light path is a prism having a reflecting surface and refracting power.

6. The optical system according to claim 1, wherein the first lens group comprises, in order from the object side, a negative lens or a negative lens surface, a portion for reflecting the light path of the element that reflecting the light path and a positive lens.

7. The optical system according to claim 1, wherein the first lens group remains fixed when magnification changes from the wide angle end to the telephoto end.

8. The optical system according to claim 1, wherein the first lens group comprises at least one aspherical surface.

9. The optical system according to claim 5, wherein an entrance surface or an exit surface of the prism is aspherical.

10. The optical system according to claim 7, wherein an utmost object-side surface of the first lens group is aspherical.

11. The optical system according to claim 1, wherein at least one of lens groups having positive refracting power and arranged on an image side of the second lens group comprises an aspherical surface and a plurality of lens elements.

12. The optical system according to claim 1, wherein a lens group arranged at an utmost image-side position in the optical system has positive refracting power and performs focusing.

13. An apparatus comprising the optical system according to claim 1, and an electronic imaging element having an imaging surface, arranged at a position where an object image formed by the optical system is to be picked up, wherein an incident light axis of the optical system is arranged in parallel to a short lateral side of the imaging surface.

14. An apparatus comprising the optical system according to claim 1, and an electronic imaging element having an imaging surface, arranged at a position where an object image formed by the optical system is to be picked up, wherein image distortion is corrected by electrical image processing on a basis of the object image optically formed on the imaging surface.

15. The apparatus according to claim 14, wherein an absolute value of a maximum distortion aberration of the optical system is less than 30%.

16. The apparatus according to claim 14, wherein a maximum correcting magnification under which distortion aberration of the optical system is electrically corrected is less than two times.

17. The apparatus according to claim 14, wherein a graph which shows a focal length of the optical system by a horizontal coordinate and a maximum distortion aberration of the optical system by a vertical coordinate is free from two or more peaks or bottoms.

18. An information processing apparatus comprising, the optical systems according to claim 1, an electronic image sensor arranged at a position where an object image formed by the optical system is to be picked up, a processing unit which processes an electronic signal derived from photo electric conversion performed by the electronic image sensor, an input section via which an operator inputs a desired information signal into the processing unit, a display element which displays output from the processing unit, and a recording medium which records the output from the processing unit, wherein the processing unit is configured such that the object image formed by the optical system and picked up by the electronic image sensor is displayed on the display element.

19. The optical system according to claim 2, wherein the element that reflects a light path is a prism having a reflecting surface and refracting power.

20. The optical system according to claim 2, wherein the first lens group comprises, in order from the object side, a negative lens or a negative lens surface, a portion for reflecting the light path of the element that reflects the light path, and a positive lens.

21. The optical system according to claim 2, wherein the first lens group remains fixed when magnification changes from the wide angle end to the telephoto end.

22. The optical system according to claim 2, wherein the first lens group comprises at least one aspherical surface.

23. The optical system according to claim 19, wherein an entrance surface or an exit surface of the prism is aspherical.

24. The optical system according to claim 21, wherein an utmost object-side surface of the first lens group is aspherical.

25. The optical system according to claim 2, wherein at least one of lens groups having positive refracting power and arranged on an image side of the second lens group comprises an aspherical surface and a plurality of lens elements.

26. The optical system according to claim 2, wherein a lens group arranged at an utmost image-side position in the optical system has positive refracting power and performs focusing.

27. An apparatus comprising, the optical system according to claim 2, and an electronic imaging element having an imaging surface, arranged at a position where an object image formed by the optical system is to be picked up, wherein an incident light axis of the optical system is arranged in parallel to a short lateral side of the imaging surface.

28. An apparatus comprising, the optical system according to claim 2, and an electronic imaging element having an imaging surface, arranged at a position where an object image formed by the optical system is to be picked up, wherein image distortion is corrected by electrical image processing on a basis of the object image optically formed on the imaging surface.

29. The apparatus according to claim 28, wherein an absolute value of a maximum distortion aberration of the optical system is less than 30%.

30. The apparatus according to claim 28, wherein a maximum correcting magnification under which distortion aberration of the optical system is electrically corrected is less than two times.

31. The apparatus according to claim 28, wherein a graph which shows a focal length of the optical system by a horizontal coordinate and a maximum distortion aberration of the optical system by a vertical coordinate is free from two or more peaks or bottoms.

32. An information processing apparatus comprising,
the optical system according to claim 2,
an electronic image sensor arranged at a position where an object image formed by the optical system is to be picked up,
a processing unit which processes an electronic signal derived from photo electric conversion performed by the electronic image sensor,
an input section via which an operator inputs a desired information signal into the processing unit,
a display element which displays output from the processing unit, and
a recording medium which records the output from the processing unit,
wherein the processing unit is configured such that the object image formed by the optical system and picked up by the electronic image sensor is displayed on the display element.

33. The optical system according to claim 3, wherein the element that reflects a light path is a prism having a reflecting surface and refracting power.

34. The optical system according to claim 3, wherein the first lens group comprises, in order from the object side, a negative lens or a negative lens surface, a portion for reflecting the light path of the element that reflects the light path, and a positive lens.

35. The optical system according to claim 3, wherein the first lens group remains fixed when magnification changes from the wide angle end to the telephoto end.

36. The optical system according to claim 3, wherein the first lens group comprises at least one aspherical surface.

37. The optical system according to claim 33, wherein an entrance surface or an exit surface of the prism is aspherical.

38. The optical system according to claim 35, wherein an utmost object-side surface of the first lens group is aspherical.

39. The optical system according to claim 3, wherein at least one of lens groups having positive refracting power and arranged on an image side of the second lens group comprises an aspherical surface and a plurality of lens elements.

40. The optical system according to claim 3, wherein a lens group arranged at an utmost image-side position in the optical system has positive refracting power and performs focusing.

41. An apparatus comprising,
the optical system according to claim 3, and
an electronic imaging element having an imaging surface, arranged at a position where an object image formed by the optical system is to be picked up,
wherein an incident light axis of the optical system is arranged in parallel to a short lateral side of the imaging surface.

42. An apparatus comprising,
the optical system according to claim 3, and
an electronic imaging element having an imaging surface, arranged at a position where an object image formed by the optical system is to be picked up,
wherein image distortion is corrected by electrical image processing on a basis of the object image optically formed on the imaging surface.

43. The apparatus according to claim 42, wherein an absolute value of a maximum distortion aberration of the optical system is less than 30%.

44. The apparatus according to claim 42, wherein a maximum correcting magnification under which distortion aberration of the optical system is electrically corrected is less than two times.

45. The apparatus according to claim 42, wherein a graph which shows a focal length of the optical system by a horizontal coordinate and a maximum distortion aberration of the optical system by a vertical coordinate is free from two or more peaks or bottoms.

46. An information processing apparatus comprising,
the optical system according to claim 3,
an electronic image sensor arranged at a position where an object image formed by the optical system is to be picked up,
a processing unit which processes an electronic signal derived from photo electric conversion performed by the electronic image sensor,
an input section via which an operator inputs a desired information signal into the processing unit,
a display element which displays output from the processing unit, and
a recording medium which records the output from the processing unit,
wherein the processing unit is configured such that the object image formed by the optical system and picked up by the electronic image sensor is displayed on the display element.

47. The optical system according to claim 4, wherein the first lens group remains fixed when magnification changes from the wide angle end to the telephoto end.

48. The optical system according to claim 4, wherein the first lens group comprises at least one aspherical surface.

49. The optical system according to claim 47, wherein an utmost object-side surface of the first lens group is aspherical.

50. The optical system according to claim 4, wherein at least one of lens groups having positive refracting power and arranged on an image side of the second lens group comprises an aspherical surface and a plurality of lens elements.

51. The optical system according to claim 4, wherein a lens group arranged at an utmost image-side position in the optical system has positive refracting power and performs focusing.

52. An apparatus comprising,
the optical system according to claim 4, and
an electronic imaging element having an imaging surface, arranged at a position where an object image formed by the optical system is to be picked up,
wherein an incident light axis of the optical system is arranged in parallel to a short lateral side of the imaging surface.

53. An apparatus comprising,
the optical system according to claim 4, and
an electronic imaging element having an imaging surface, arranged at a position where an object image formed by the optical system is to be picked up,
wherein image distortion is corrected by electrical image processing on a basis of the object image optically formed on the imaging surface.

54. The apparatus according to claim 53, wherein an absolute value of a maximum distortion aberration of the optical system is less than 30%.

55. The apparatus according to claim 53, wherein a maximum correcting magnification under which distortion aberration of the optical system is electrically corrected is less than two times.

56. The apparatus according to claim 53, wherein a graph which shows a focal length of the optical system by a horizontal coordinate and a maximum distortion aberration of the optical system by a vertical coordinate is free from two or more peaks or bottoms.

57. An information processing apparatus comprising, the optical system according to claim 4, an electronic image sensor arranged at a position where an object image formed by the optical system is to be picked up, a processing unit which processes an electronic signal derived from photo electric conversion performed by the electronic image sensor, an input section via which an operator inputs a desired information signal into the processing unit, a display element which displays output from the processing unit, and a recording medium which records the output from the processing unit, wherein the processing unit is configured such that the object image formed by the optical system and picked up by the electronic image sensor is displayed on the display element.

* * * * *